US012746868B2

(12) United States Patent
Arnold et al.

(10) Patent No.: US 12,746,868 B2
(45) Date of Patent: Sep. 29, 2026

(54) TRUCK BED CAMPER

(71) Applicant: Tune Outdoor LLC, Golden, CO (US)

(72) Inventors: Kristian Arnold, Golden, CO (US); Broc Patterson, Indian Hills, CO (US)

(73) Assignee: Tune Outdoor LLC, Denver, CO (US)

( * ) Notice: Subject to any disclaimer, the term of this patent is extended or adjusted under 35 U.S.C. 154(b) by 358 days.

(21) Appl. No.: 18/513,961

(22) Filed: Nov. 20, 2023

(65) Prior Publication Data

US 2024/0166119 A1 May 23, 2024

Related U.S. Application Data

(60) Provisional application No. 63/427,323, filed on Nov. 22, 2022.

(51) Int. Cl.
*B60P 3/34* (2006.01)
*B60R 9/02* (2006.01)

(52) U.S. Cl.
CPC . *B60P 3/34* (2013.01); *B60R 9/02* (2013.01)

(58) Field of Classification Search
CPC .................................. B60P 3/34; B60P 3/341
See application file for complete search history.

(56) References Cited

U.S. PATENT DOCUMENTS

| | | | | |
|---|---|---|---|---|
| 4,201,413 | A * | 5/1980 | Rowe | B60P 3/34 296/176 |
| 6,749,252 | B2 | 6/2004 | Cervenka | |
| 9,475,371 | B2 | 10/2016 | LaBiche | |
| 10,086,684 | B1 | 10/2018 | Stamm, Jr. | |
| 10,596,951 | B1 | 3/2020 | Williams | |
| 10,611,219 | B2 | 4/2020 | Trinier | |
| 10,829,028 | B2 | 11/2020 | Delgadillo, Jr. | |
| 10,985,689 | B2 | 4/2021 | Wickramasekera | |
| 11,028,613 | B2 | 6/2021 | Harrison et al. | |
| 11,105,112 | B2 | 8/2021 | Montesalvo et al. | |
| 11,130,437 | B1 | 9/2021 | Tatro | |
| 11,203,279 | B1 | 12/2021 | Tatro | |
| 11,225,187 | B1 | 1/2022 | Koehler | |
| 2020/0317111 | A1 | 10/2020 | Mundt et al. | |
| 2020/0391650 | A1 | 12/2020 | Leishman et al. | |

(Continued)

FOREIGN PATENT DOCUMENTS

| | | | |
|---|---|---|---|
| EP | 2874850 | B1 | 5/2019 |
| FR | 3110506 | | 11/2021 |
| WO | 2021/194642 | | 9/2021 |

OTHER PUBLICATIONS

Project M Topper, "Meet the Popup Camper", obtained online on Mar. 12, 2024 at https://fourwheelcampers.com/model/project-m, 15 pages.

*Primary Examiner* — Robert E Fuller
(74) *Attorney, Agent, or Firm* — Merchant & Gould P.C.

(57) ABSTRACT

A truck bed camper includes a frame system configured to support a pop-up roof. The frame system includes a roof frame, an intermediate frame, and a pair of cargo side frames. Each of the frames are formed by a plurality of extruded rails coupled together by a high strength plastic bracket. The roof frame, the intermediate frame, and the cargo side frames each having different rail and bracket profiles from each other. Hinge supports extend between the intermediate frame and the roof frame and are configured to move the roof frame between at least a raised configuration and a collapsed configuration.

19 Claims, 23 Drawing Sheets

(56) References Cited

U.S. PATENT DOCUMENTS

| | | | | |
|---|---|---|---|---|
| 2021/0249988 | A1 | 8/2021 | Wickramasekera | |
| 2021/0293047 | A1 | 9/2021 | Frederickson | |
| 2021/0323465 | A1 | 10/2021 | Konig | |
| 2022/0162879 | A1* | 5/2022 | Davis | E04H 15/06 |
| 2023/0286444 | A1* | 9/2023 | Kuschmeader | B60R 9/06 |

* cited by examiner

FIG. 10
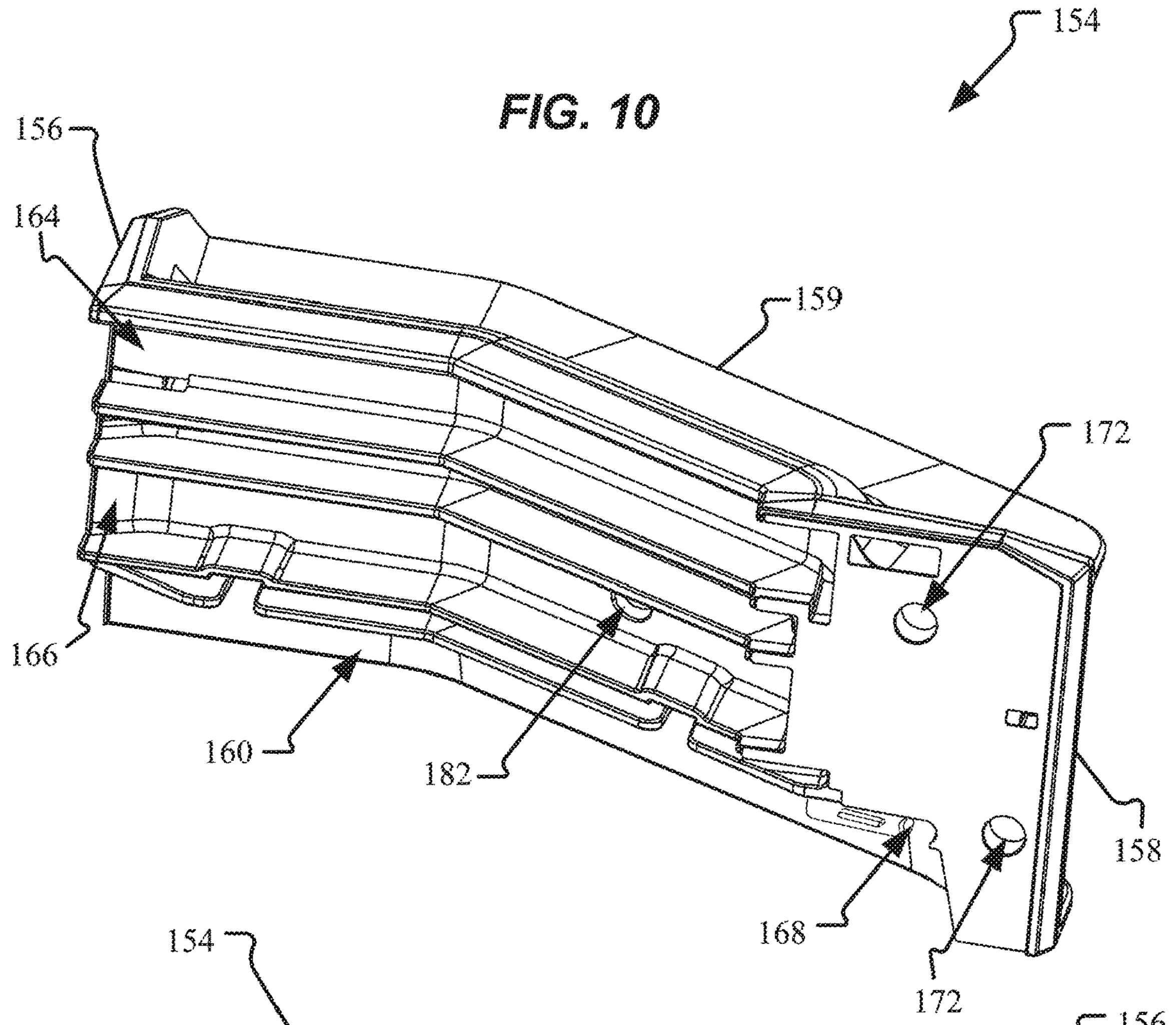
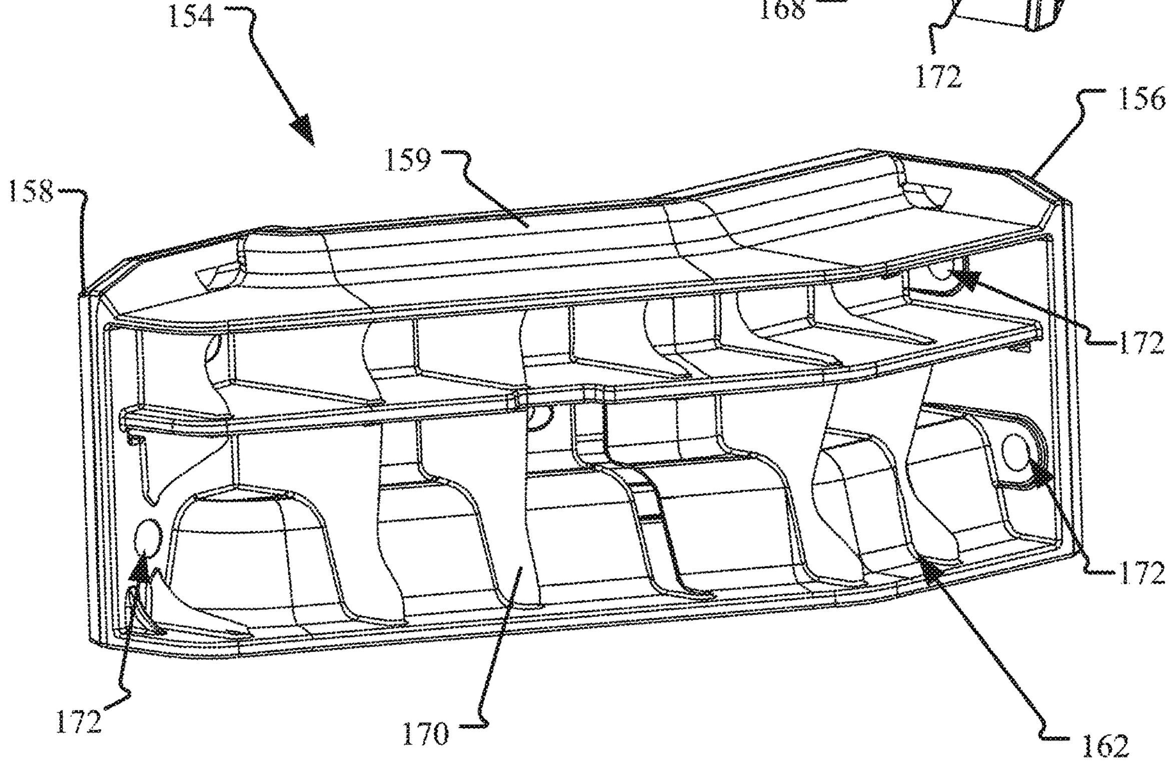
FIG. 11

TRUCK BED CAMPER

CROSS-REFERENCE TO RELATED APPLICATION(S)

This application claims priority to, and the benefit of, U.S. Provisional Patent Application No. 63/427,323, filed Nov. 22, 2022, the disclosure of which is hereby incorporated by reference herein in its entirety.

INTRODUCTION

Truck bed campers are independent camper structures that can be mounted and demounted from a bed of a vehicle such as a pickup truck. Truck bed campers are also known as a truck camper, slide-in camper, pickup camper, cab-over camper, demounted or dismounted camper, tray camper, and the like. Known truck bed campers can be pop-up with a hinged roof that moves upward for camping and retracts downward for travel, or hard side with a roof in a fixed position. Within the truck bed campers, amenities such as beds, kitchens, and the like may be included. Truck bed campers are versatile and are capable of going most places that the pickup truck can go. These known truck bed campers, however, are difficult to assemble and often require fabricating unique connections which are difficult to repair. Additionally, these known truck bed campers are difficult to customize with accessories as required or desired. Accordingly, improvements are desired.

SUMMARY

A truck bed camper is described herein. The truck bed camper includes a frame system having cargo side frames, an intermediate frame, and a roof frame. The roof frame is configured to raise relative the intermediate frame for use and to collapse for travel. The frame system includes a plurality of rails connected by bracket assemblies in order to form each frame assembly. This configuration facilitates modularity of the truck bed camper such that it is easy to ship, assemble, and repair. Additionally, the rails include T-shaped tracks on both the inside and outside so that the frame system can support a wide variety of customizations including racks, riggings, accessories, additions, and the like.

In an aspect, the technology relates to a truck bed camper including: a first cargo side frame including a plurality of side rails coupled together with a plurality of cargo brackets, the first cargo side frame configured to secure to a truck bed of a truck; a second cargo side frame also including the plurality of side rails coupled together with the plurality of cargo brackets, the second cargo side frame spaced apart from the first cargo side frame and configured to secure to the truck bed of the truck; an intermediate frame including a plurality of intermediate rails coupled together with a plurality of intermediate brackets, the intermediate frame supported on the first and second cargo side frames and having at least one bed panel, wherein the intermediate frame cantilevers from the first and second cargo side frames; a roof frame including a plurality of roof rails coupled together with a plurality of roof brackets, the roof frame having at least one roof panel and moveably disposed above the intermediate frame, the roof frame moveable between at least a collapsed configuration, whereby the roof frame is positioned directly on top of the intermediate frame, and a raised configuration, whereby the roof frame is spaced apart from the intermediate frame; and at least one hinged roof support coupled between the intermediate frame and the roof frame and configured to move the roof frame between the collapsed configuration and the raised configuration, and wherein the roof frame is substantially parallel to the intermediate frame in both the collapsed configuration and the raised configuration.

In an example, the plurality of cargo brackets, the plurality of intermediate brackets, and the plurality of roof brackets are formed from a different material than the plurality of side rails, the plurality of intermediate rails, and the plurality of roof rails. In another example, each of the plurality of side rails, the plurality of intermediate rails, and the plurality of roof rails are extruded components, and each include an internal receiver configured to receive a fastener for securing to a respective bracket. In yet another example, each of the plurality of cargo brackets, the plurality of intermediate brackets, and the plurality of roof brackets have an interior side and an exterior side, a plurality of apertures are defined and accessible from the exterior side for the fastener. In still another example, the truck bed camper further includes at least one flexible side wall extending between the intermediate frame and the roof frame, the intermediate frame defines a first exterior channel extending through the plurality of intermediate rails and the plurality of intermediate brackets, and the roof frame defines a second exterior channel extending through the plurality of roof rails and the plurality of roof brackets, the at least one flexible side wall coupled between the first and second exterior channels. In an example, the at least one hinged roof support includes a first member pivotably coupled to one of the plurality of intermediate rails and a second member pivotably coupled to one of the plurality of roof rails, the first member pivotably coupled to the second member at a hinge, the at least one hinged roof support further includes an elongated third member having a first end pivotably coupled to the one of the plurality of intermediate rails and a second end configured to engage with the second member to lock the roof frame in the raised configuration.

In another example, each of the plurality of intermediate rails and the plurality of roof rails include at least one substantially T-shaped channel, the at least one hinged roof support coupled to a respective rail at the at least one substantially T-shaped channel. In yet another example, the truck bed camper further includes a light system, and each of the plurality of roof rails include an exterior light channel configured to support the light system, the exterior light channel disposed within an interior living area of the truck bed camper. In still another example, the truck bed camper further includes at least one hatch door having a top rail, a sill rail, and a wall panel therebetween, each of the plurality of intermediate rails include an exterior hatch channel, the top rail at least partially received within the exterior hatch channel such that the at least one hatch door pivots relative to a respective intermediate rail. In an example, the first and second cargo side frames each include a pair of vertical side rails and a bottom horizontal side rail of the plurality of side rails, the pair of vertical side rails and the bottom horizontal side rail each having the same cross-sectional profile. In another example, the truck bed camper further includes a cab wall extending between the first and second cargo side frames, the cab wall supporting the at least one bed panel.

In another aspect, the technology relates to a truck bed camper including: a first cargo side frame having a first bottom rail, a first front vertical rail, and a first rear vertical rail forming a U-shape, each of the rails of the first cargo side frame coupled together by a first bracket; a second cargo side frame spaced apart from the first cargo side frame, the second cargo side frame having a second bottom rail, a second front vertical rail, and a second rear vertical rail forming a U-shape, each of the rails of the second cargo side frame also coupled together by the first bracket, the rails of the first and second cargo side frames all having a first cross-sectional profile; an intermediate frame having a first front rail, a first rear rail, a first side rail, and a second side rail forming a rectangular shape, each of the rails of the intermediate frame coupled together by a second bracket, the first and second side rails supported on the respective first and second cargo side frames such that the first and second side rails are cantilevered and the first front rail is offset from the first and second cargo side frames, the rails of the intermediate frame all having a second cross-sectional profile that is different than the first cross-sectional profile; a roof frame having a second front rail, a second rear rail, a third side rail, and a fourth side rail forming a rectangular shape, each of the rails of the roof frame coupled together by a third bracket, the rails of the roof frame all having a third cross-sectional profile that is different than the first and second cross-sectional profiles; and at least one hinged roof support coupled between the intermediate frame and the roof frame, the roof frame being selectively vertically moveable relative to the intermediate frame via the at least one hinged roof support.

In an example, the first cargo side frame supports a first side hatch and the second cargo side frame supports a second side hatch, the first and second side hatches positioned outward from an inner edge of the first and second bottom rails. In another example, the truck bed camper further includes a flexible side wall extending between the intermediate frame and the roof frame. In yet another example, the first bracket, the second bracket, and the third bracket all have different shapes. In still another example, each of the brackets are formed from a different material than each of the rails. In an example, the truck bed camper further includes one or more roof panels supported by the roof frame, each of the plurality of roof rails and the third bracket define a channel shaped and sized to receive an edge of the one or more roof panels, and one or more wedges secure the edge of the one or more roof panels within the channel.

In another aspect, the technology relates to a pop-up frame for a truck bed camper including: a plurality of roof rails defining a roof frame, each of the plurality of roof rails coupled together with a roof bracket formed from a different material than the plurality of roof rails; a plurality of intermediate rails defining an intermediate frame disposed below the roof frame, each of the plurality of intermediate rails coupled together with an intermediate bracket formed from a different material than the plurality of intermediate rails; a plurality of side rails defining a pair of cargo side frames disposed below the intermediate frame, each of the plurality of side rails coupled together with a cargo bracket formed from a different material than the plurality of side rails; and a plurality of hinged roof supports extending between the intermediate frame and the roof frame, the plurality of hinged roof supports configured to move the roof frame between at least a raised configuration and a collapsed configuration with respect to the intermediate frame, and the roof frame being substantially parallel to the intermediate frame in both the raised configuration and the collapsed configuration.

In an example, the intermediate frame defines a first exterior channel extending through the plurality of intermediate rails and the intermediate bracket, and the roof frame defines a second exterior channel extending through the plurality of roof rails and the roof bracket, at least one flexible side wall is configured to extend between the first and second exterior channels. In another example, each of the plurality of hinged roof supports includes a first member pivotably coupled to one of the plurality of intermediate rails and a second member pivotably coupled to one of the plurality of roof rails, the first member pivotably coupled to the second member at a hinge, an elongated third member having a first end pivotably coupled to the one of the plurality of intermediate rails and a second end configured to engage with the second member to lock the roof frame in the raised configuration.

BRIEF DESCRIPTION OF THE DRAWINGS

The following drawing figures, which form a part of this application, are illustrative of described technology and are not mean to limit the scope of the invention as claimed in any manner, which scope shall be based on the claims appended hereto.

FIGS. 10 and 11 are perspective views of a roof bracket of the roof bracket assembly shown in FIG. 9.

DETAILED DESCRIPTION

Figure 1:
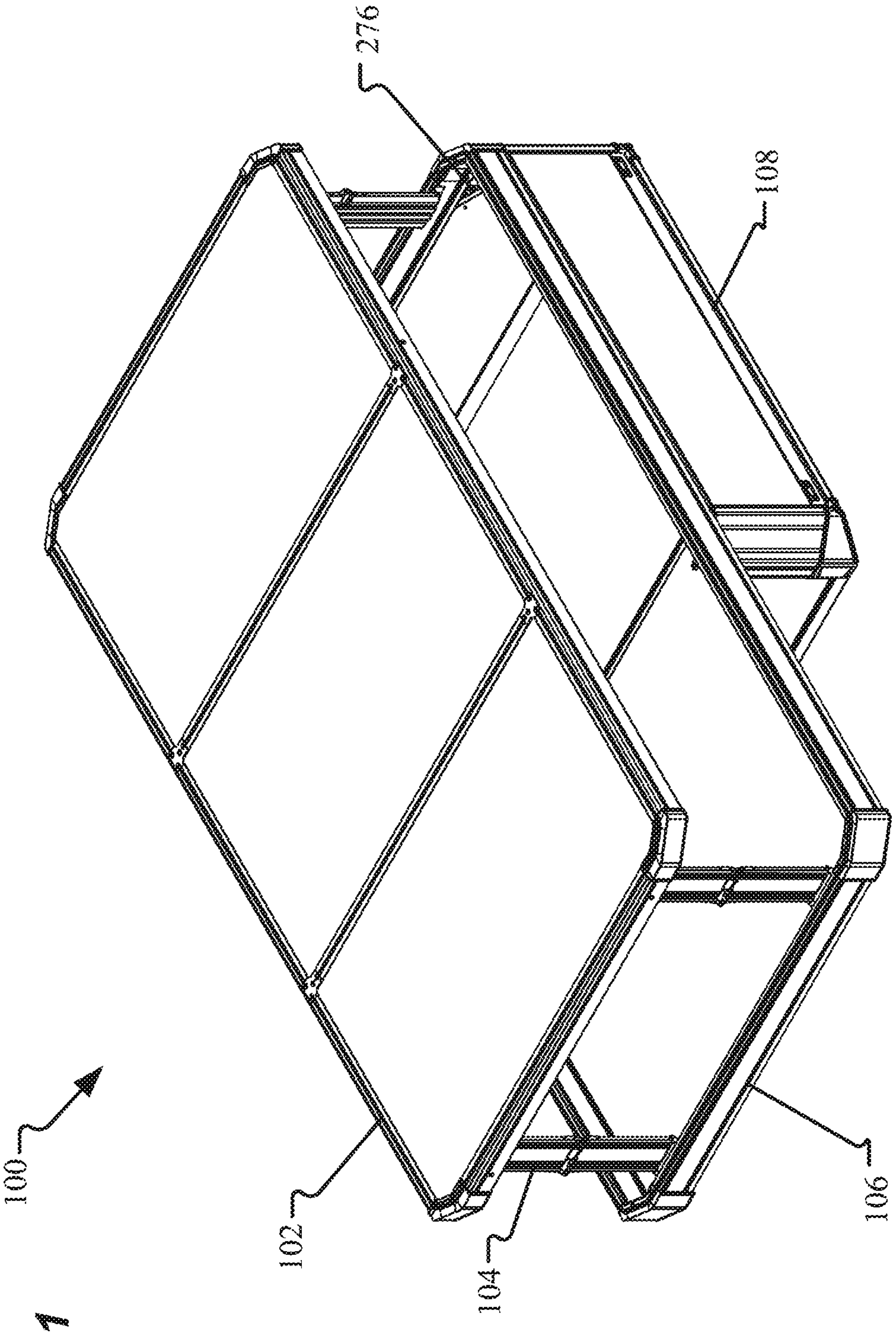
FIG. 1 is a perspective view of an exemplary truck bed camper.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," "an example," "an aspect," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). Moreover, one having skill in the art will understand the degree to which terms such as "about," "approximately," or "substantially" convey in light of the measurement techniques utilized herein. To the extent such terms may not be clearly defined or understood by one having skill in the art, the term "about" shall mean plus or minus ten percent.

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

Throughout this description, references to orientation (e.g., front(ward), rear(ward), top, bottom, back, right, left, upper, lower, etc.) of the truck bed camper relate to its position when mounted on a truck vehicle and are used for ease of description and illustration only. No restriction is intended by use of the terms regardless of how the truck bed camper is situated on its own.

In the examples described below a truck bed camper having a modular frame system is described. The frame system of the truck bed camper is formed by a plurality of rails and a plurality of bracket assemblies. The construction of the frame system facilitates modularity of the truck bed camper for shipping, assembly, and repair. The rails may be an extruded component such that external and internal features are defined and to facilitate assembly and versatility. The bracket assemblies are formed from polymer material for strength and ease of use. The frame system includes a pair of cargo side frames that are configured to couple to a bed of a truck and at least partially project therefrom increasing the living space within the truck bed camper. An intermediate frame is supported by the pair of cargo side frames while having a cantilevered bed panel. A roof frame is supported over the intermediate frame and is configured to move between at least a raised configuration and a collapsed configuration.

Between the intermediate frame and the roof frame, a flexible side wall couples between the rails and extends across the bracket assemblies. The flexible side wall is configured to collapse with the roof frame and provides panoramic views from the living space. The roof frame can also support a light system for the living space. The cargo side frames and the intermediate frame can support a plurality of hatch doors for easy access to the living space from multiple sides of the truck bed camper.

Figure 2:
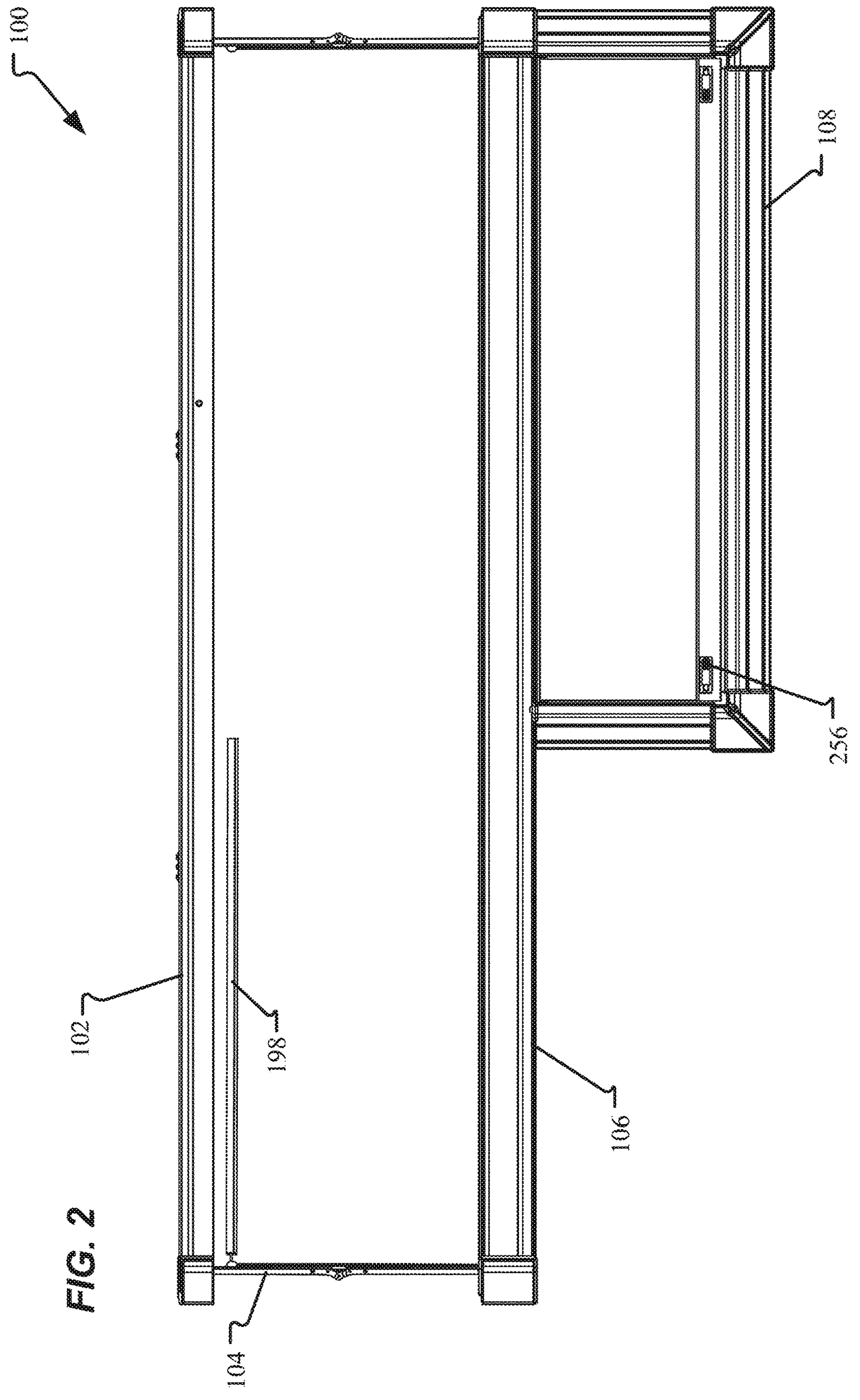
FIG. 2 is a side elevation view of the truck bed camper.
Figure 3:
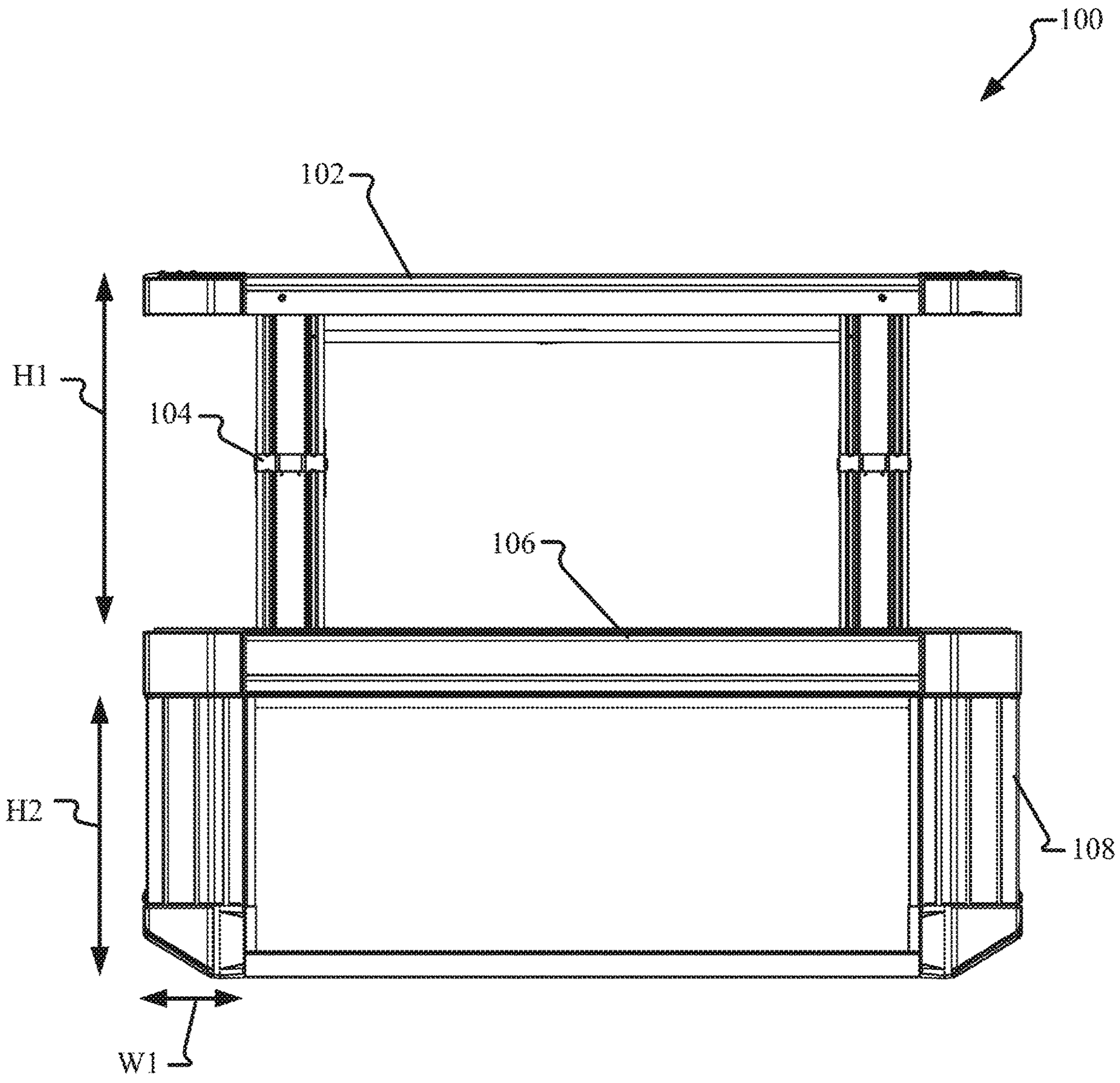
FIG. 3 is a front elevation view of the truck bed camper.
Figure 4:
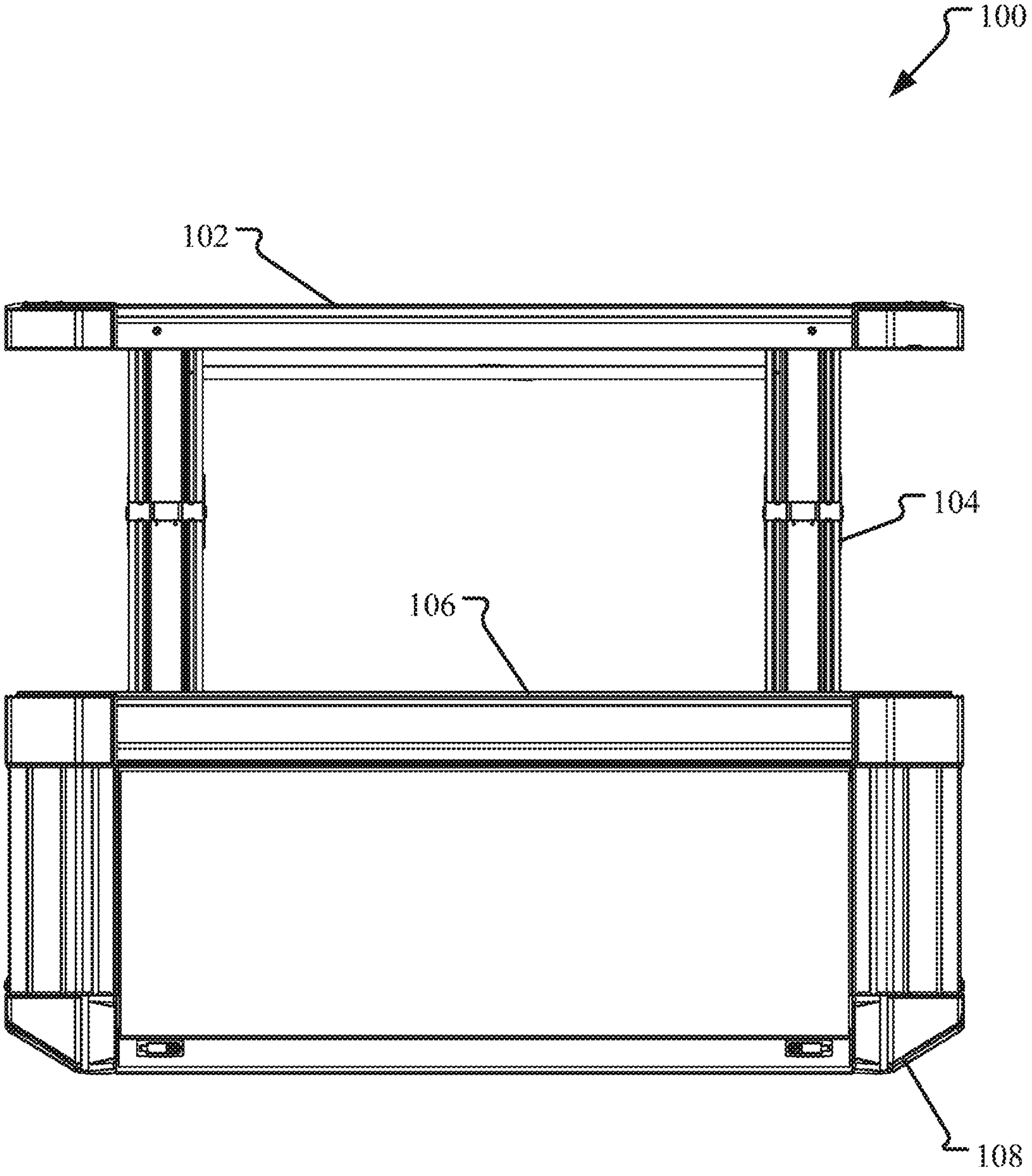
FIG. 4 is a rear elevation view of the truck bed camper.
Figure 5:
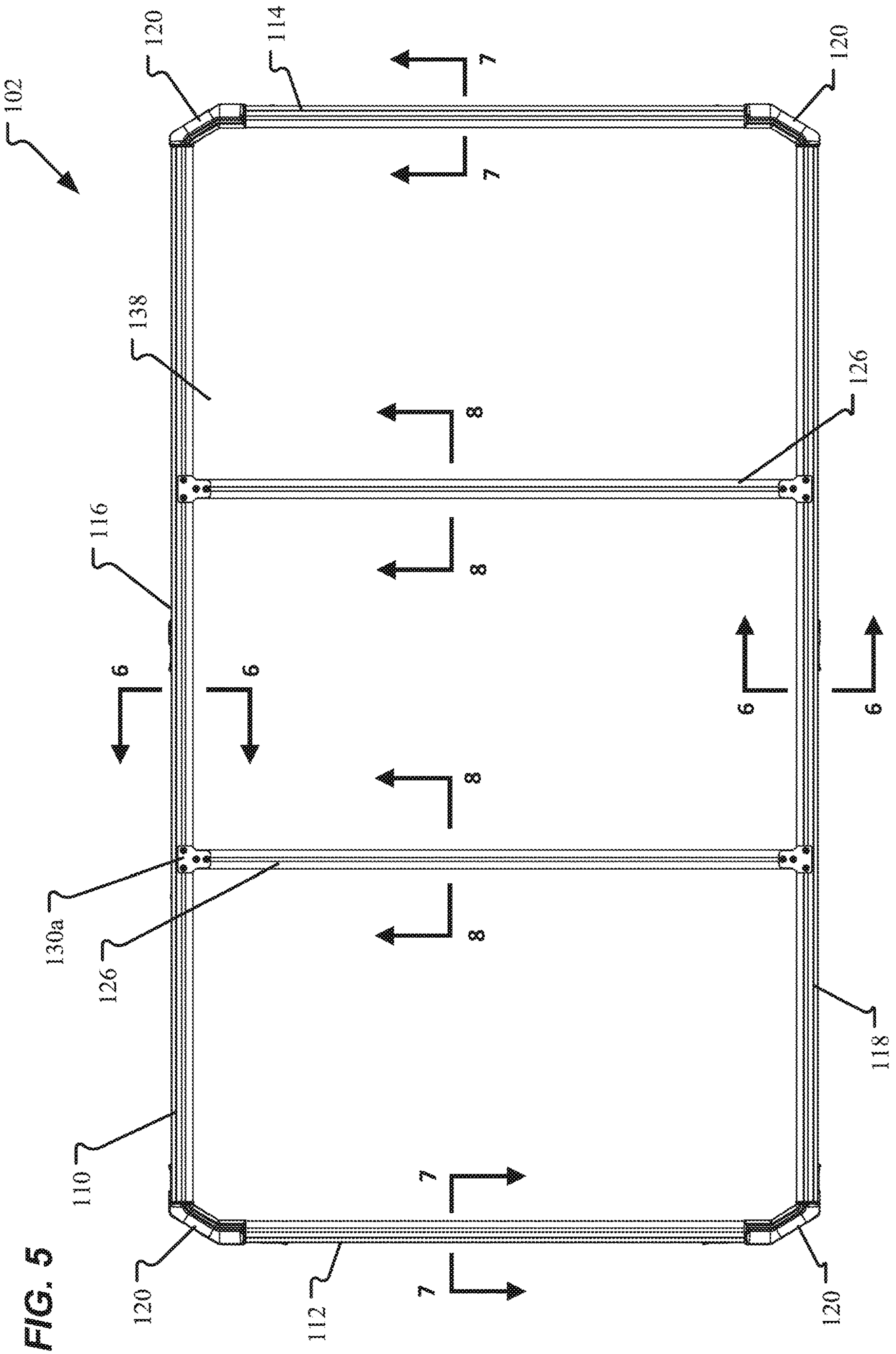
FIG. 5 is a top plan view of a roof of the truck bed camper.

FIG. 1 is a perspective view of an exemplary truck bed camper 100. FIGS. 2-4 are side, front, and rear elevation views, respectively, of the truck bed camper 100. Referring concurrently to FIGS. 1-4, the truck bed camper 100 is a pop-up type camper with a roof 102 supported by a plurality of hinged roof supports 104. The roof 102 is illustrated in its raised position/configuration with the hinged roof supports 104 extended in a vertical direction. The hinged roof supports 104 are configured to allow the roof 102 to be lowered in a collapsed configuration towards an intermediate section 106 so as to reduce the overall height of the truck bed camper 100 for traveling. In the example, the roof 102 and the intermediate section 106 are substantially parallel to each other in both the raised configuration and the collapsed configuration. The roof 102 and the intermediate section 106 may also have the same outer perimeter shape. A cargo bed section 108 extends below the intermediate section 106 and is configured to be mounted on top of cargo bed rails of the truck vehicle (not shown). Both the roof 102 and the intermediate section 106 are cantilevered from the cargo bed section 108 so that at least a portion of the truck bed camper 100 extends above a cab of the truck vehicle when mounted thereon.

The truck bed camper 100 defines an interior living space that is protected from exterior elements. A flexible sidewall extending between the roof 102 and the intermediate section 106 is not shown in FIGS. 1-5. The cargo bed section 108 has an open bottom such that the living space extends into the truck bed. As such, when the roof 102 is in the raised configuration, head height in the living space may be between 6'-4" to 6'-10" depending on the size of the truck bed. It is appreciated that head height may be below or above 6'-4" to 6'-10" as required or desired. Additionally, with the strength of the roof 102 and the intermediate section 106, the hinged roof supports 104 allow for a panoramic viewing area from within the living space and when the roof 102 is in its raised configuration. In the example, the flexible side wall extends between the intermediate section 106 and the roof 102 and remains attached when the roof 102 moves towards the collapsed configuration. In the example, a height H1 of the roof 102 relative to the intermediate section 106 is larger than a height H2 of the intermediate section 106 relative to the bottom of the cargo bed section 108. This configuration facilitates increasing the living space when the roof 102 is raised. Additionally, the outer sides of the cargo bed section 108 have a width W1 that projects from the side of the truck to further increase the living space. In an aspect, the truck bed camper 100 is not a slide-in camper whereby portions of the camper frame slide in and out for extending the livable space.

FIGS. 5-8 illustrate the roof 102 of the truck bed camper 100 (shown in FIGS. 1-4). The roof 102 has a roof frame 110 with a front rail 112, an opposite rear rail 114, a first side rail 116, and a second side rail 118. The rails form a substantially rectangular shape and each end of the rails is coupled to the adjacent rails with a roof bracket assembly 120. In the example, the side rails 116, 118 have a longer length than the front and rear rails 112, 114. Each of the rails is formed from an extrusion process and each of the rails have the same cross-sectional shape. Additionally, the roof bracket assembly 120 at opposite ends of the front and rear rails 112, 114 may be formed as a mirror image to each other and to accommodate all four corners of the roof frame 110. As such, the construction of the roof frame 110 facilitates an ease of assembly and an ease of reparability. In an aspect, the roof 102 may include one or more roof vents (not shown). The roof vents may be passive or active (e.g., a powered fan) as required or desired.

Figure 6:
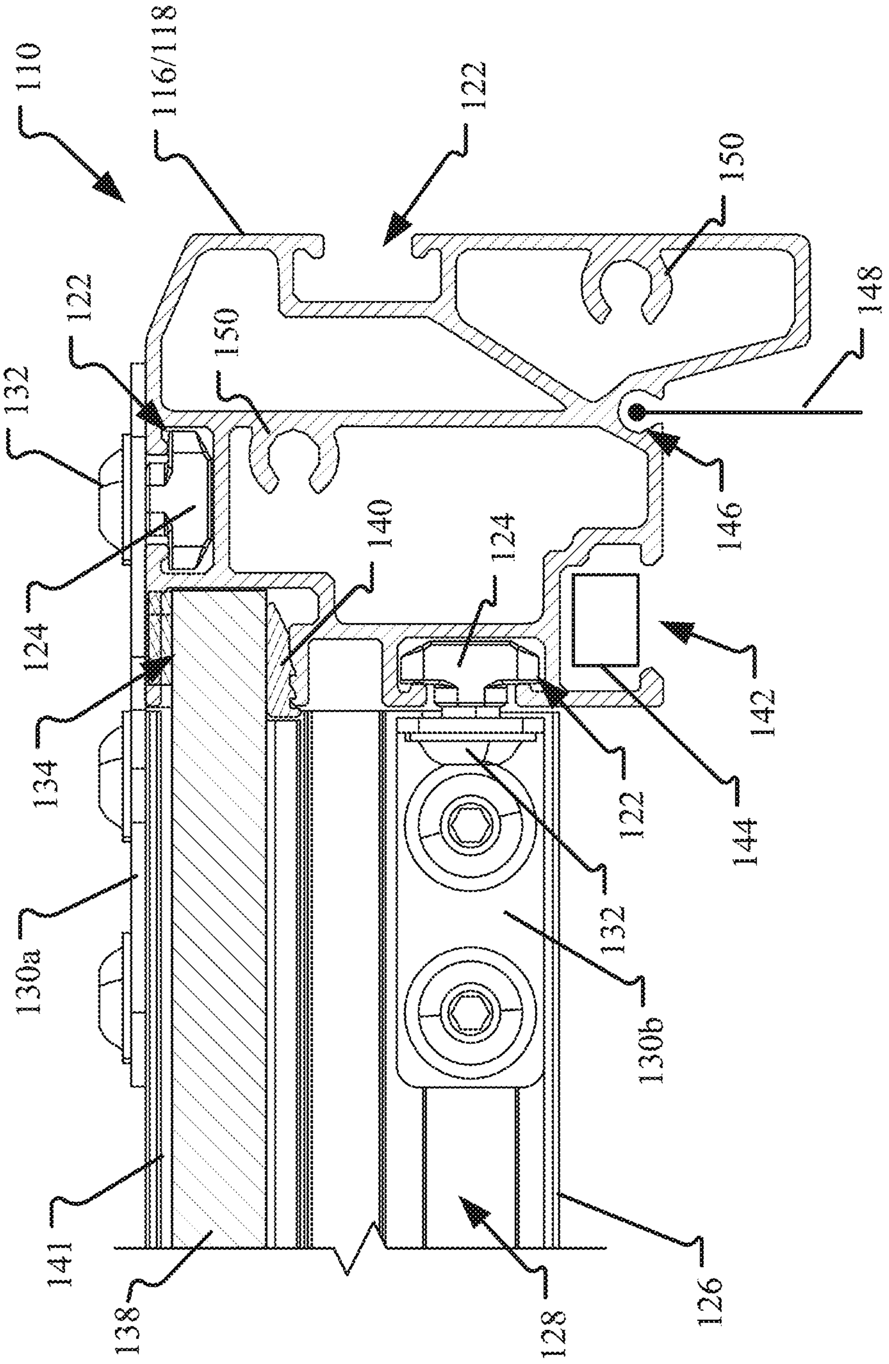
FIG. 6 is a cross-sectional view of the roof shown in FIG. 5 and taken along line 6-6.
Figure 7:
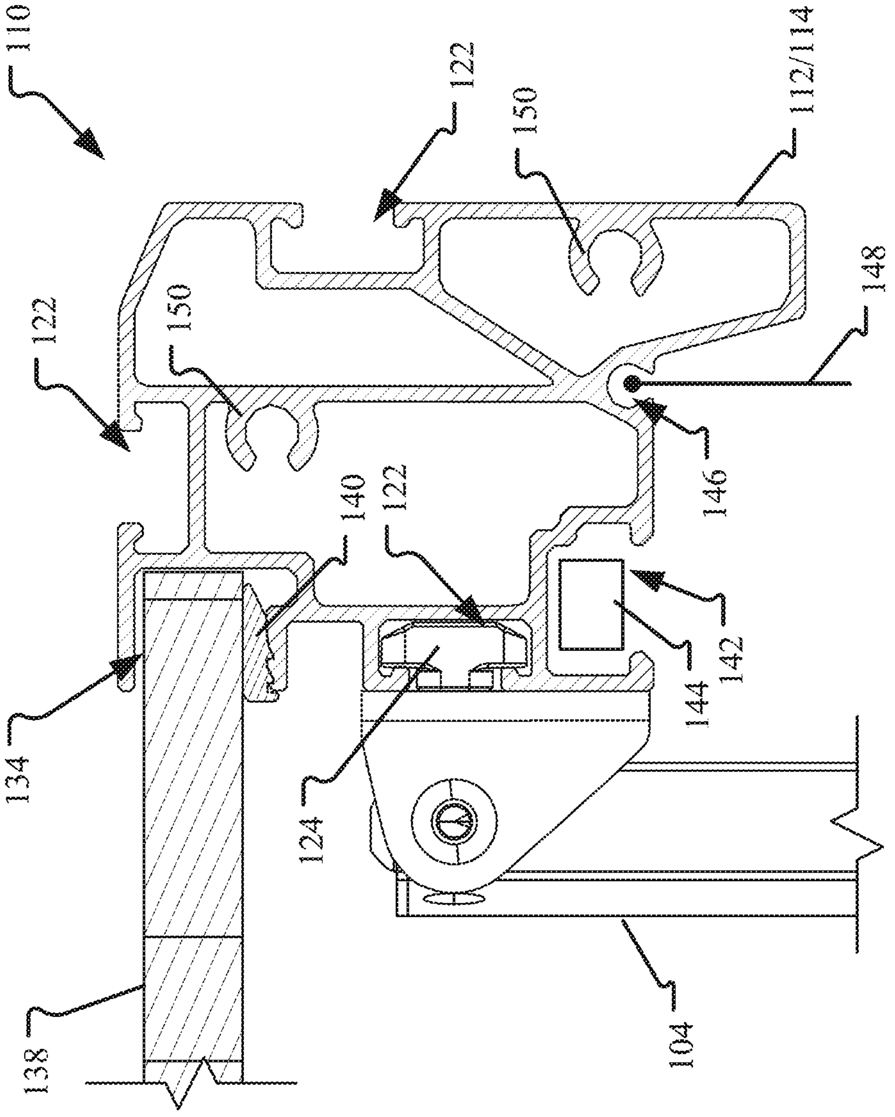
FIG. 7 is another cross-sectional view of the roof shown in FIG. 5 and taken along line 7-7.
Figure 8:
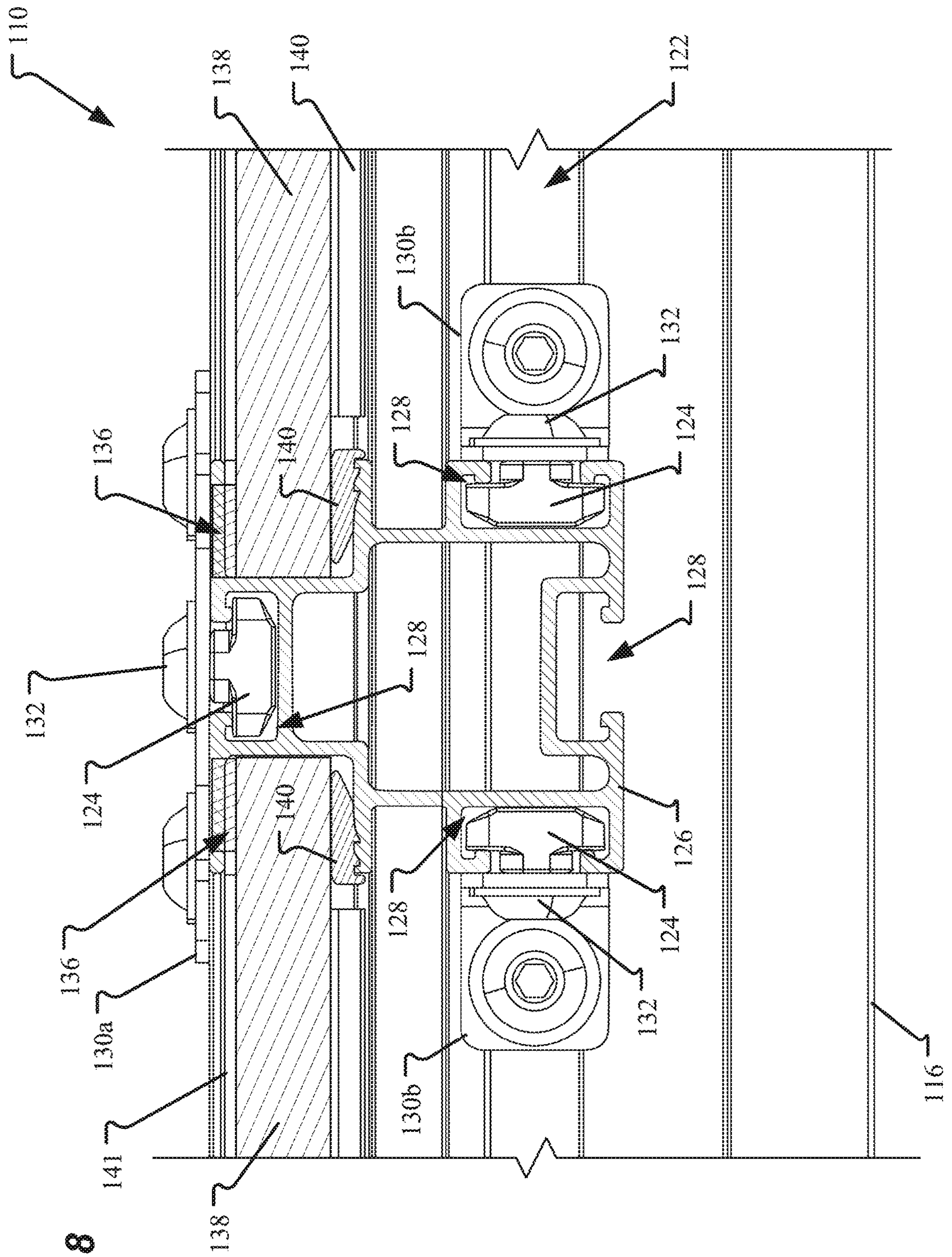
FIG. 8 is another cross-sectional view of the roof shown in FIG. 5 and taken along line 8-8.

The cross-sectional shape of each of the rails is illustrated in FIGS. 6 and 7. Each rail includes one or more T-shaped channel 122. For example, each rail has an inside T-shaped channel, an outside T-shaped channel, and a top T-shaped channel. Each T-shaped channel 122 has a similar size and is configured to receive a corresponding channel mount 124 so that components can be coupled to the roof frame 110. For example, the front and rear rails 112, 114 are coupled to the hinged roof support 104 via the inside T-shaped channel 122 and as illustrated in FIG. 7.

The roof frame 110 also includes one or more cross-bars 126. The cross-bars 126 are also formed from an extrusion process, but with a different cross-sectional shape than the rails. The cross-bar 126 includes T-shaped channels 128 that are disposed on all four sides (e.g., top, bottom, right-side, and left-side). The cross-bar 126 is configured to extend between the first and second side rails 116, 118 and secure to the rails 116, 118 via mounting plates 130 and bolts 132 for the channel mounts 124. For example, and as shown in FIG. 6, a top flat mounting plate **130*a* engages with the top T-shaped channel 122 of the rail 116 or 118 and the top T-shaped channel 128 of the cross-bar 126, while side mounting plates 130*b* engage with the inner T-shaped channel 122 of the rail 116 or 118 and the side T-shaped channel 128 of the cross-bar 126. The T-shaped channels 122 that are not used for the roof frame 110 are open and may be utilized for attaching further components to the roof frame 110** as required or desired.

Each rail also includes a substantially U-shaped interior channel 134 and the cross-bar 126 includes opposing U-shaped interior channels 136. The channels 134, 136 are positioned above the T-shaped channels 122, 128 and are configured to receive and support a roof panel 138 (e.g., a polypropylene honeycomb material with a fiberglass face or other materials). In the example, a wedge member 140 is used to frictionally secure the roof panel 138 within the roof frame 110. A gasket 141 may be also disposed within the top of the channel 134 for an environmental seal. As illustrated, three roof panels 138 are provided. In other aspects, more or less roof panels may be utilized as required or desired.

Each rail also includes a substantially U-shaped bottom channel 142. The channel 142 is configured to support a light system 144. In an aspect, the light system 144 may be a battery powered LED light system and a diffuser strip (not shown) may be positioned across the opening of the channel 142. The light system 144 is disposed within the interior living area of the truck bed camper. Adjacent the channel 142, each rail includes a circular bottom channel 146 configured to receive at least a portion of a flexible side wall 148 that at least partially forms the exterior of the truck bed camper 100 and defining an interior living area therein for use. In an example, the channel 146 is configured to extend 360° around the roof frame 110 and through the roof bracket assemblies 120. For example, the flexible side wall 148 may include an edge bead that is secured within the channel 146.

The extruded rails also include interior receivers 150 that extend the entire length of the rails. The interior receivers 150 are configured to receive fasteners 152 (shown in FIG. 9) of the roof bracket assembly 120 so that the rails can be coupled to a bracket 154 (shown in FIG. 9) and form the roof frame 110 that is modular and easy to assembly and repair. The interior receivers 150 may be offset from each other within the interior of the rails and be formed on different planes.

Figure 9:
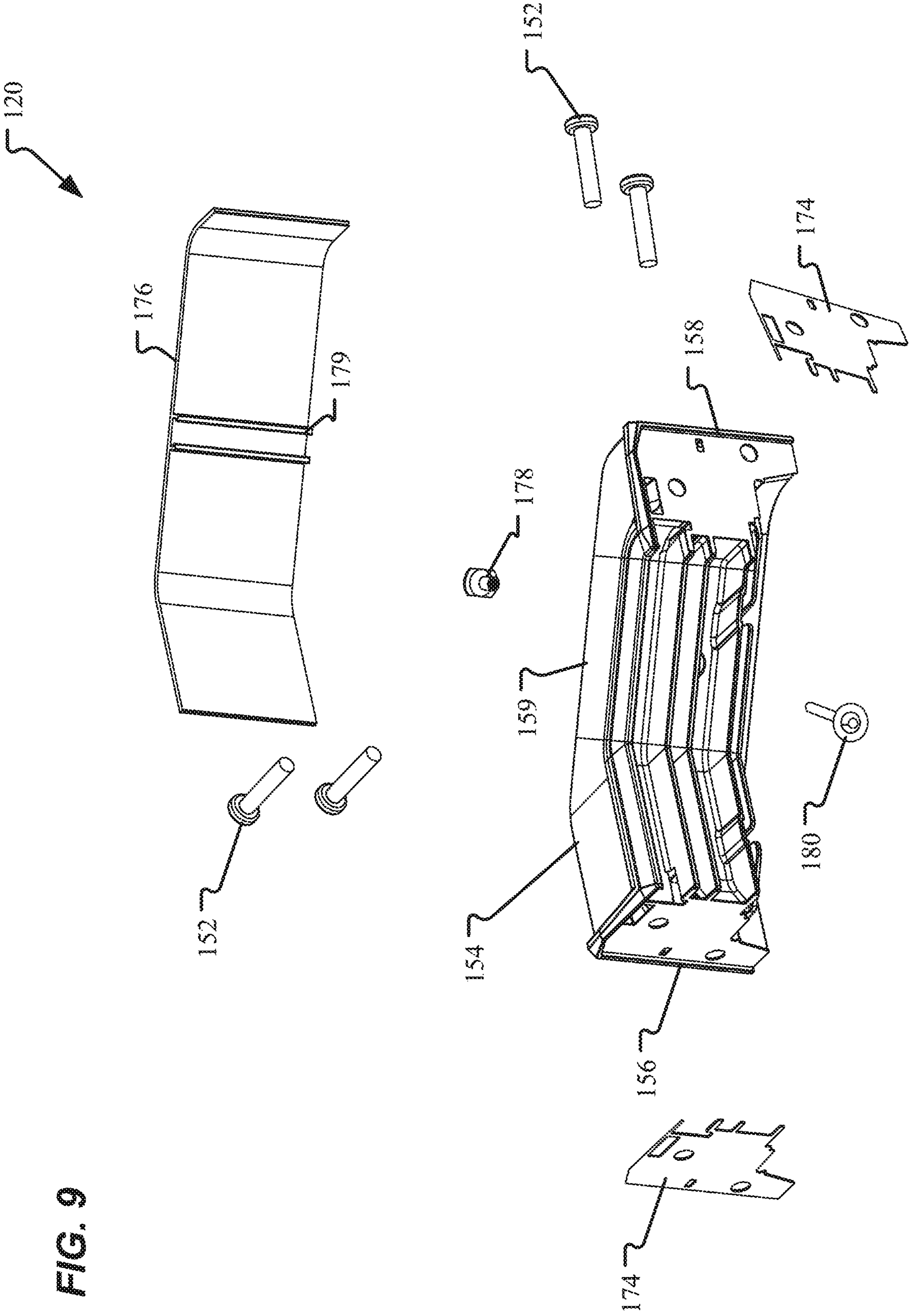
FIG. 9 is an exploded view of a roof bracket assembly.

FIGS. 9-11 illustrate the roof bracket assembly 120. The roof bracket assembly 120 includes the bracket 154 that is a molded plastic component. In an aspect, the bracket 154 is a glass fiber filled polymer material. Other materials are also contemplated herein. In an example, the bracket 154 is a different material than the rails which may be formed from an extruded aluminum. The bracket 154 includes a first end 156 that couples to an end of a rail and an opposite second end 158 that couples to an end of another rail. The first end 156 is orthogonal to the second end 158 so that the rails are positioned square to each other. The bracket 154, however, is not square. Between the first end 156 and the second end 158, the bracket 154 includes an oblique section 159 so that the bracket is not a square L-shape. The first and second ends 156, 158 are flat surfaces so that the rails can be formed with simple 90° cuts.

The bracket 154 has an interior 160 and an exterior 162. The interior 160 defines an upper channel 164 that receives the edges of the roof panel 138 which is secured with the wedge 140 and aligned with the interior channel 134 of the rails (all shown in FIGS. 6-8). A lower channel 166 aligns with the interior T-shaped channel 122 of the rails. The bottom of the interior 160 also has a circular bottom channel 168 that receives the flexible side wall 148 and aligns with the channel 146 of the rails (shown in FIGS. 6-7) and so that the flexible side wall 148 can extend around the bracket 154. In an example, the circular bottom channel 168 may be at least partially formed by a cover member that couples to the bracket 154. The exterior 162 is open with a plurality of support ridges 170. The open construction of the exterior 162 enables for fastener apertures 172 to be formed in the end walls. The fasteners 152 are configured to be inserted from the exterior 162 and into the rails for coupling the bracket 154 to the rails. The fasteners 152 may be self-tapping bolts that are configured to be received within the interior receivers 150 of the extruded rails. This facilitates the assembly process with a reduced number of fasteners and no welding is needed. In an aspect, the bracket 154 material is stronger than the material of the extruded rails (e.g., aluminum). In the example, the bracket 154 (e.g., an injection molded composite polymer) is a structural member that couples together two or more the rails (e.g., structural beams) so as to facilitate efficiency in the cost of goods sold for the truck bed camper and reduce time in the manufacturing and assembly process (e.g., welding and manufacturing aluminum brackets).

In the example, a gasket 174 may be positioned between the bracket 154 and the rail. Because the exterior 162 is open, a cover 176 is used to cover the exterior cavities of the bracket 154. The cover 176 supports a nut 178 (e.g., via a pair of tracks 179) on its interior so that a fastener 180 can extend through a hole 182 within the oblique section 159 of the bracket 154. The configuration of the roof bracket assembly 120 facilitates assembly and support of the roof 102.

Figure 12:
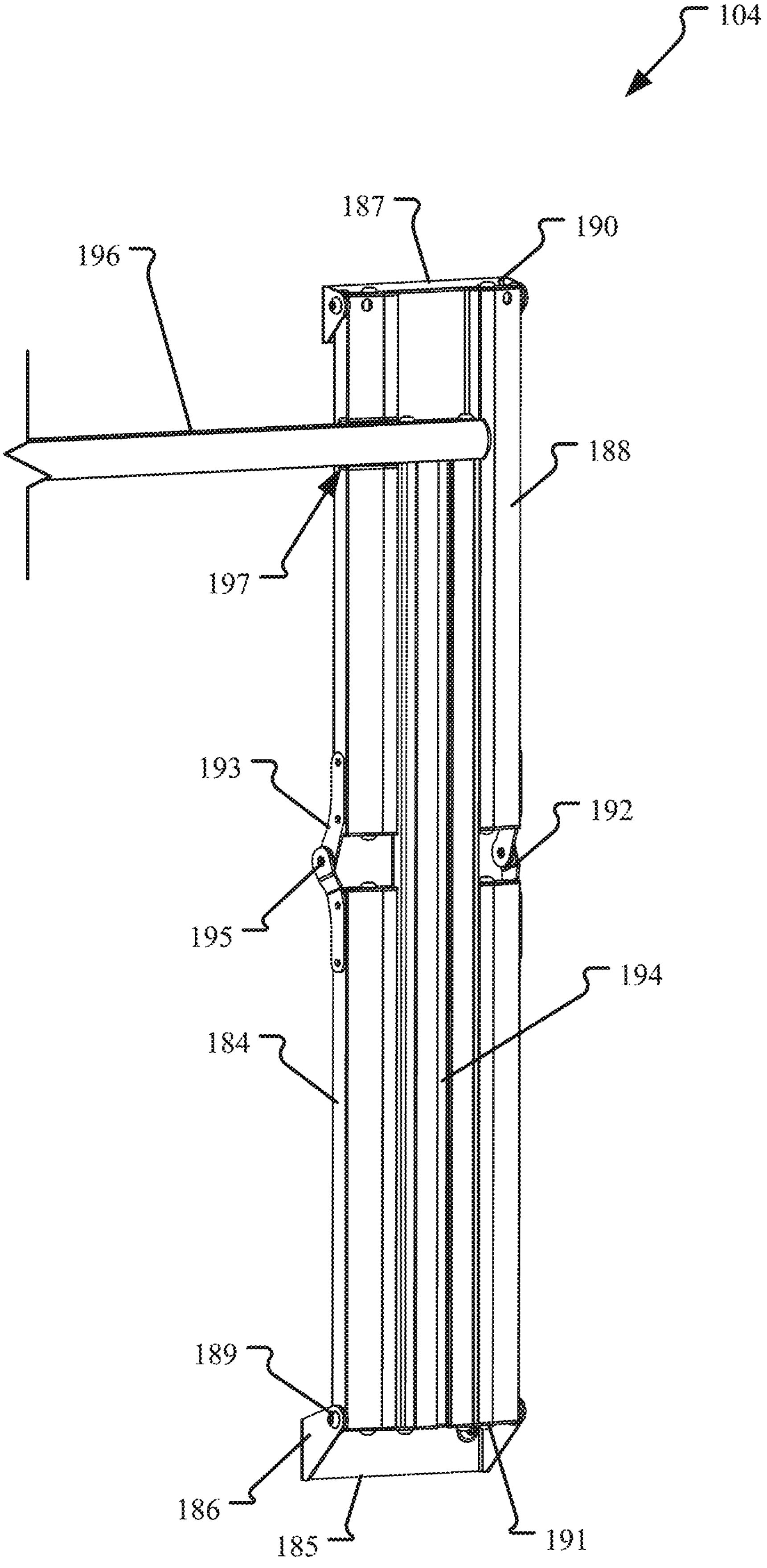
FIG. 12 is a perspective view of a hinged roof support.
Figure 15:
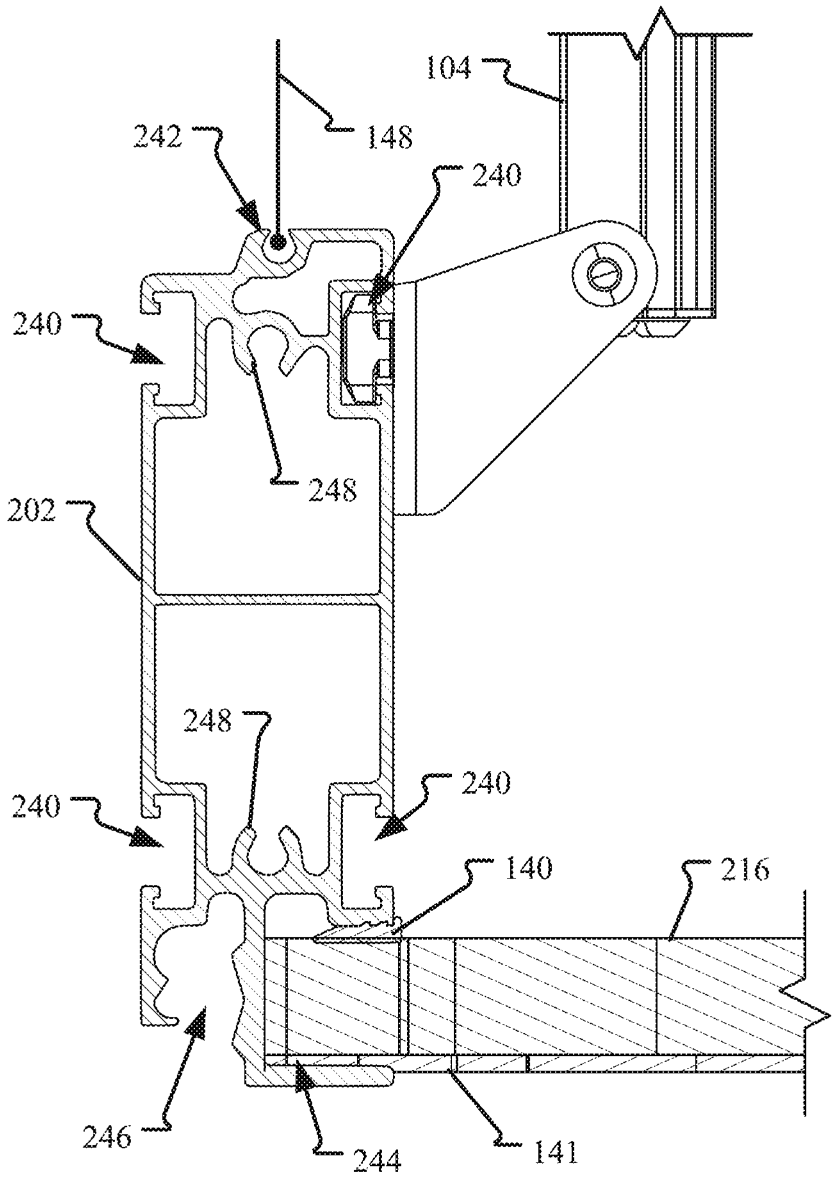
FIG. 15 is a cross-sectional view of the intermediate section shown in FIG. 13 and taken along line 15-15.

FIG. 12 is a perspective view of the hinged roof support 104. The hinged roof support 104 includes a first member 184 that is pivotably coupled to the intermediate section 106 (shown in FIGS. 1-4) via a brace 186. A second member 188 is pivotably coupled to the roof 102 (shown in FIGS. 1-4) via a brace 190. In the example, the braces 186, 190 are mounted to a T-shaped channel of an inside of the front and rear rails and as illustrated in FIG. 7 described above and FIGS. 15 and 18 described below. The braces 186, 190 include a U-shaped body 185 that mounts to the rails and an end plate 187 that is pivotably supported by the U-shaped body 185 at pivot pins 189 and secures to the ends of the first and second members 184, 188 at fasteners 191.

The first member 184 and the second member 188 are pivotably coupled together by a hinge 192. In the example, the hinge 192 includes upper and a lower arm plates 193 coupled together at a pivot point 195. The hinge 192 enables the ends of the first and second members 188 to be spaced apart from each other such that in the collapsed configuration the roof 102 may be disposed directly on top of the intermediate section 106.

A third member 194 is also pivotably supported by the brace 186 and is configured to move independently from the second member 188. The first and second members 184, 188 have a substantially U-shaped cross-section and the third member 194 is disposed within the channel formed by the U-shaped body. A proximal end of the third member 194 is mounted to the pivotable end plate 187. A distal free end of the third member 194 terminates prior to reaching the brace 190 and is coupled to a cross-member 196. The third member 194 has a longer length than the first or second members 184, 188. The cross-member 196 acts as a handle for the hinged roof support 104 and extends between two hinged roof supports 104 so that the two front and back hinged roof supports 104 are coupled together. The second member 188 defines a recess 197 that is shaped and sized to at least partially receive the cross-member 196.

As illustrated in FIG. 12, the hinged roof support 104 is shown in its extended/raised configuration. In the raised configuration, all three members 184, 188, 194 are positioned vertically with the third member 194 at least partially within the first and second members 184, 188 and the cross-member 196 engaged with the recess 197. The cross-member 196 is engaged with the second member 188 so as to lock and secure the hinged roof support 104 in the raised configuration. To lower to the roof 102, the cross-member 196 and the third member 194 are pulled away from and disengaged from the second member 188. The third member 194 remains coupled to the first member 184 so that movement of the third member 194 can fold the first and second members 184, 188 with respect to one another about the hinge 192 to collapse the hinged roof support 104. In one example, a handle 198 (shown in FIG. 2) may be coupled to the cross-member 196 for the front hinged roof supports 104 and so that the user can reach over the bed extension.

Figure 13:
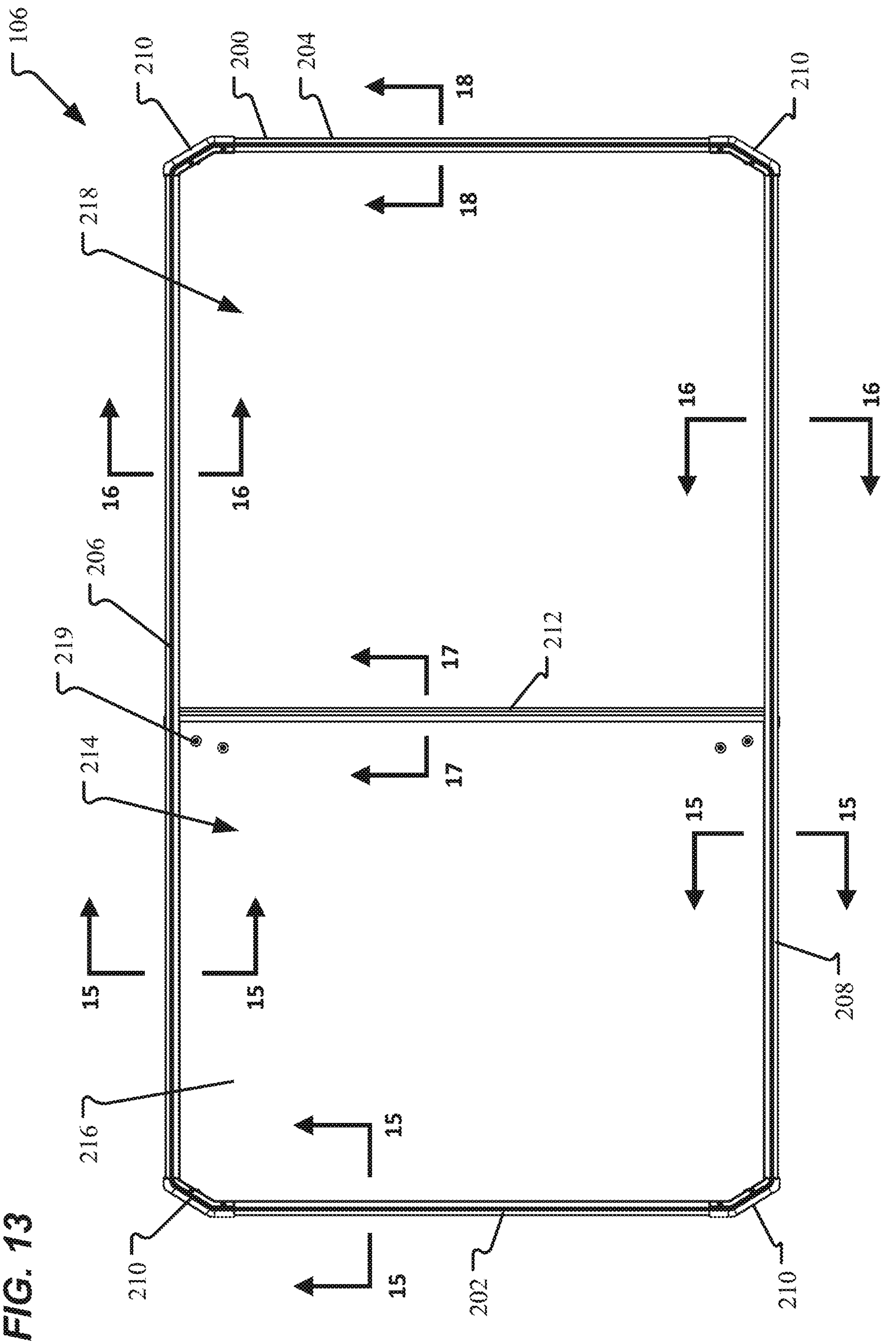
FIG. 13 is a top plan view of an intermediate section of the truck bed camper.
Figure 14:
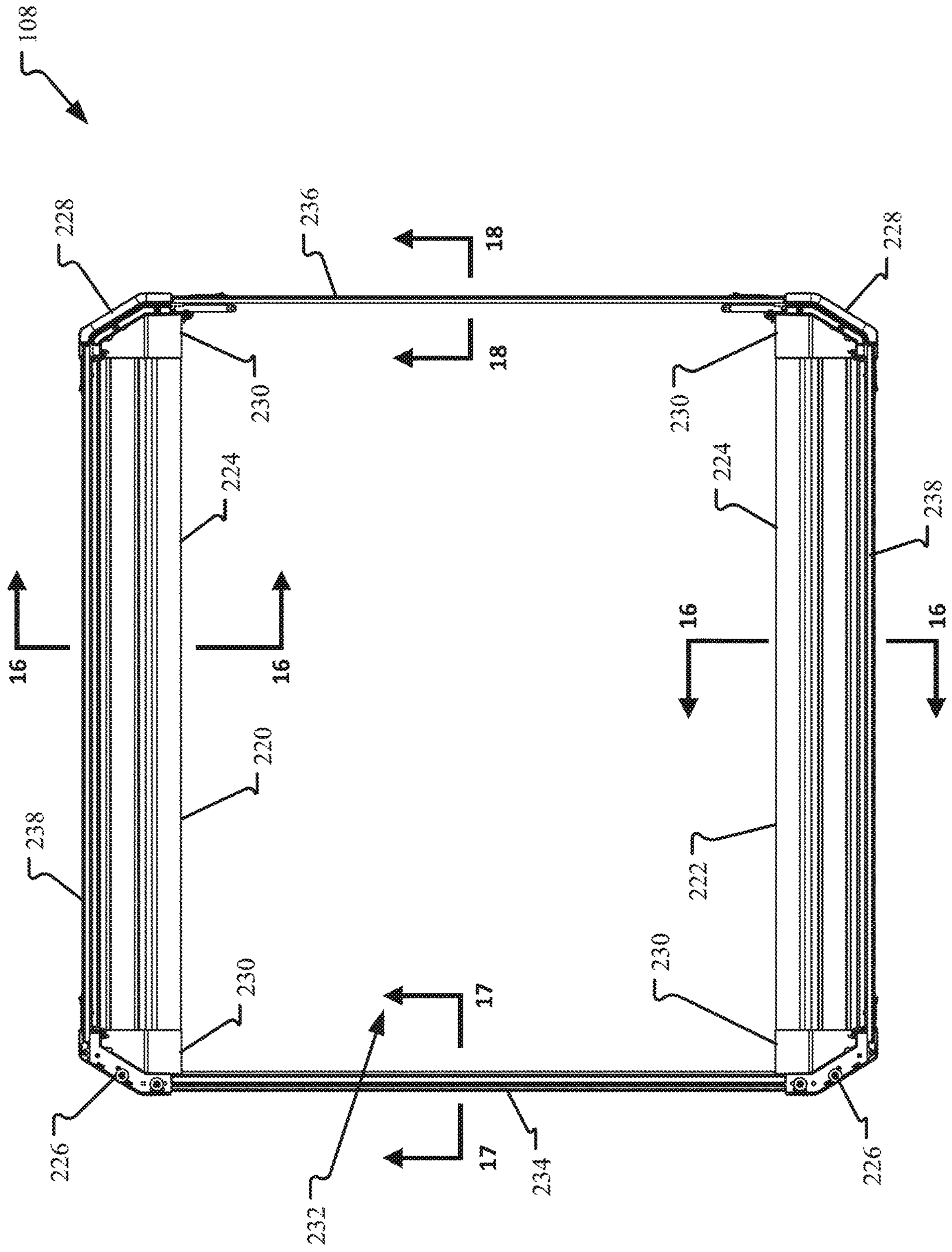
FIG. 14 is a top plan view of a cargo bed section of the truck bed camper.

FIG. 13 is a top plan view of the intermediate section 106 of the truck bed camper 100 (shown in FIG. 1-4). FIG. 14 is a top plan view of the cargo bed section 108 of the truck bed camper 100. The intermediate section 106 and the cargo bed section 108 are coupled together and form the base of the truck bed camper 100 and the portion of the frame system of the camper that is secured to or faces the truck vehicle when installed. Starting first with FIG. 13, the intermediate section 106 has an intermediate frame 200 that has a similar size and shape of the roof frame 110 (shown in FIG. 5). The intermediate frame 200 includes a front rail 202, a rear rail 204, a first side rail 206, and a second side rail 208. Intermediate bracket assemblies 210 are configured to couple the rails together. Additionally, the intermediate bracket assemblies 210 at opposite ends of the front and rear rails 202, 204 may be formed as a mirror image to each other and to accommodate all four corners of the intermediate frame 200. In the example, these rails are extruded components, and all have a similar cross-sectional shape. In an aspect, the intermediate rails have a different cross-sectional shape than the roof rails described above.

A cross-member 212 extends between the first and second side rails 206, 208. The cross-member 212 divides the intermediate frame 200 into a bed section 214 with a bed panel 216 and an open area 218 that is open to the cargo bed section 108 disposed below. In the example, the bed section 214 cantilevers from the cargo bed section 108 and is disposed at least partially above the cab of the truck vehicle, while the open area 218 is disposed at least partially above the bed of the truck vehicle. The bed panel 216 may be coupled to the rail below with fasteners 219. In the example, the bed panel 216 is configured to support a mattress (not shown) for a sleeping area. In an aspect, the length between the cross-member 212 and the front rail 202 may be about 60".

Turning next to FIG. 14, the cargo bed section 108 as illustrated in a top plan view includes a first side frame 220 and a second side frame 222. The first and second side frames 220, 222 are positioned in a vertical plane in contrast to the horizontal plane of the roof frame 110 and the intermediate frame 200. Each of the first and second side frames 220, 222 include a bottom rail 224, a front vertical rail 226, and a rear vertical rail 228. As such, the first and second side frames 220, 222 form a U-shape and is configured to couple to the bottom of the intermediate frame 200. Cargo bed bracket assemblies 230 are used to couple the rails together. The cargo bed rails are extruded and have a different cross-sectional shape than the intermediate frame and roof frame extrusions described above.

The cargo bed section 108 defines an open area 232 so that the truck bed camper 100 is in communication with the truck bed with the bottom rails 224 configured to couple to the truck bed (e.g., via clamps and straps between the bottom rails and the side walls of the truck bed that the cargo bed section sits upon (not shown)). A cab wall 234 is coupled between the two front vertical rails 226 and is disposed at the front of the cargo bed section 108 configured to face the cab of the truck vehicle. A rear hatch 236 is coupled between the two rear vertical rails 228 and is configured to be disposed above the tailgate of the truck vehicle. Each of the first and second side frames 220, 222 supports a side hatch 238.

FIGS. 15-18 are cross-sectional views of the intermediate and cargo bed sections 106, 108. Starting with FIG. 15, the front rail 202 is illustrated with the hinged roof support 104 coupled thereto. Inside and outside surfaces of the front rail 202 include T-shaped channels 240. For example, the channels 240 facilitates coupling the hinged roof support 104 to the rail or any other accessories as described herein. The top of the front rail 202 includes a circular-shaped channel 242 for attaching the flexible side wall 148 as described herein. The bottom of the front rail 202 includes a U-shaped channel 244 for supporting the bed panel 216 with the wedge 140 and the gasket 141 at the bottom for an environmental seal. In examples, the bed panel 216 may be formed with the same material and a same thickness as the roof panel 138 described above. Additionally, the bottom of the front rail 202 includes a hatch channel 246 sized and shaped to receive a top of the rear hatch 236 or side hatch 238 in some areas of the intermediate frame 200. The hatch channel 246 has a distinctive cross-sectional shape as it forms a portion of a hinged element and to allow the hatches described herein to pivot for opening. The front rail 202 also includes interior receivers 248 that extend the entire length of the rail. The interior receivers 150 are configured to receive fasteners of the bracket assemblies as described herein.

Figure 16:
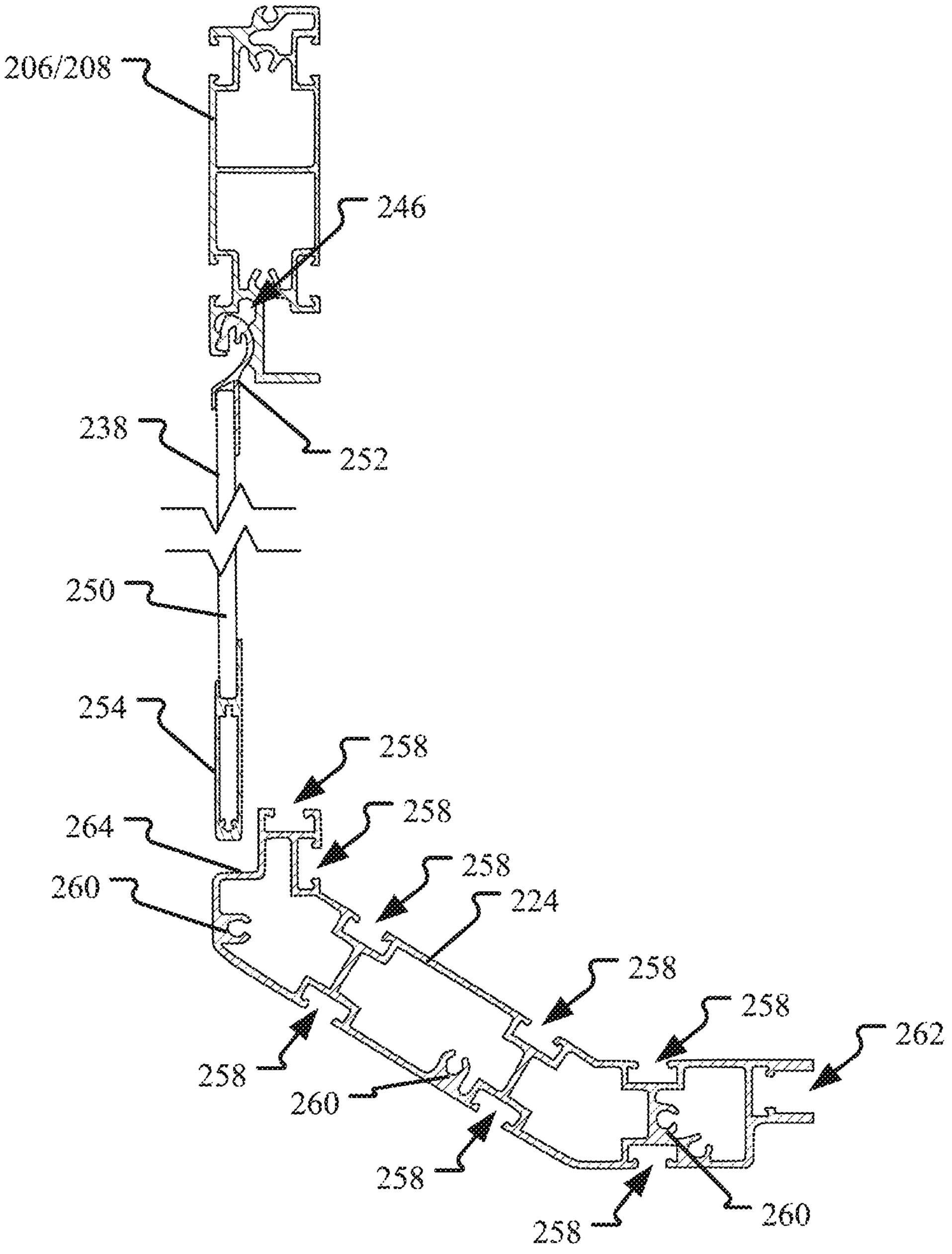
FIG. 16 is a cross-section view of the intermediate and cargo bed sections shown in FIGS. 13 and 14 and taken along line 16-16.

FIG. 16 illustrates the first or second side rail 206, 208 with the side hatch 238 installed. The rail 206, 208 has the same cross-sectional shape as the front rail 202 described above. The side hatch 238 includes a wall panel 250 with a top rail 252 configured to form a hinge with the hatch channel 246 and allow the side hatch 238 to pivot outwards to open. A sill rail 254 is configured to engage with the bottom rail 224. In examples, the hatch channel 246 may have one or more struts (not shown) that facilitates operation of the side hatch 238 and maintains the top rail 252 within the channel 246. The sill rail 254 may have one or more lock assemblies 256 (shown in FIG. 2) so as to secure the side hatch 238 in a closed position. The lock assemblies 256 are configured to engage with the vertical rails of the cargo bed sections.

In an example, the wall panel 250 may be an aluminum panel. In other examples, the wall panel 250 may be a tempered glass panel. By using the top rail 252 and sill rail 254 for attaching the side hatch 238 to the frame system, the side hatch 238 can be easily tailored to any type of wall panel material as required or desired. In the example, the top rail 252 has a circular shaped cross-sectional profile with a return having a distal bead. This profile interconnects with the hatch channel 246 such that a pivoting connection is formed directly therebetween and the top rail 252 is pivotable relative to the side rail.

The bottom rail 224 includes a plurality of T-shaped channels 258 in both the interior and exterior sides to facilitate coupling components thereto. For example, kitchen accessories may be mounted at least partially to any one or more of the rails 206, 208, 224 as required or desired. Interior receivers 260 also are provided for the bracket assemblies. A U-shaped channel 262 is provided so that when the rail 224 is used as a vertical rail 226, 228, the cab wall 234 (shown in FIG. 14) can be supported. The rail 224 also forms a shoulder 264 for receiving at least a portion of the side hatch 238. In the example, the ends of the rail 224 are oriented substantially orthogonal to each other and with an oblique section therebetween. This cross-sectional profile allows the bottom rail 224 to be also used for the vertical rails of the cargo bed section. The end of the rail 224 that has the U-shaped channel 262 forms the part of the rail 224 that is configured to sit on the truck bed wall. The oblique section is angled up from that end, and thereby, allows the side hatch 238 and the rails 206, 208 to be positioned outside of the truck bed wall and cantilever therefrom. This increases the interior space of the truck bed camper 100.

Figure 17:
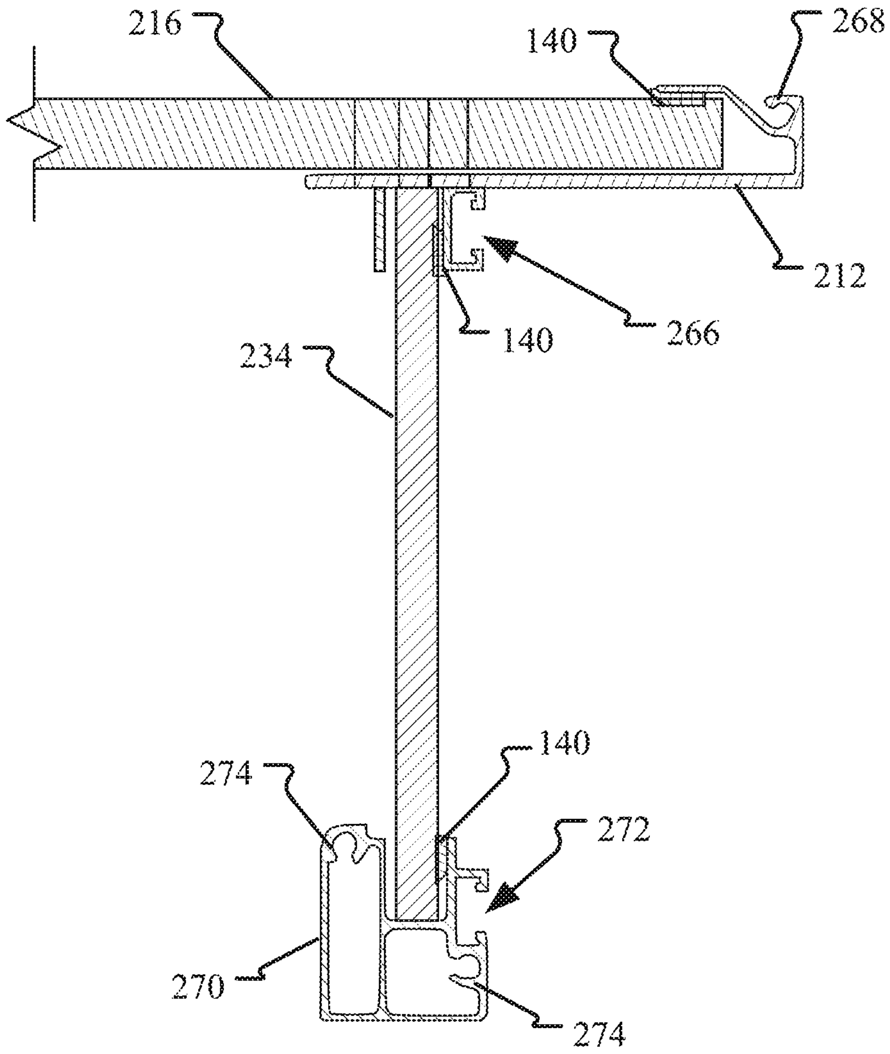
FIG. 17 is a cross-section view of the intermediate and cargo bed sections shown in FIGS. 13 and 14 and taken along line 17-17.

Turning to FIG. 17, the bed panel 216 and cross-member 212 coupling is illustrated. The bed panel 216 at least partially cantilevers above the cab wall 234. Both the bed panel 216 and the cab wall 234 are secured to the cross-member 212 with wedges 140 and gaskets (not shown for an environmental seal). A T-shaped channel 266 is also provided so that accessories can be supported inside the frame system. The cross-member 212 also includes a hook 268 so that a pivoting extension panel (not shown) can couple to the cross-member 212 and form an adjustable bed extension when siting on the bed panel 216. In an aspect, the bed extension may be slidable along the bed panel 216 and then pivot and lock into a reclined position. The cab wall 234 has a lower rail 270 that is also an extruded piece to support the cab wall 234 and includes a T-shaped channel 272 and interior receivers 274. The lower rail 270 extends between the cargo bed bracket assemblies 230 at the front of the cargo bed section 108. In the example, the cab wall 234 may include a slider window (not shown) for access to the truck cab as required or desired. The cab wall 234 is secured to the lower rail 270 with the wedge 140 and gaskets (not shown) and as described herein.

The bed panel 216 extends between the first and second side rails 206, 208 and the first and second side rails 206, 208 are cantilevered from the cargo bed section 108. In an example the cantilevered length of the rails 206, 208 is at least 24 inches. In an aspect, the cantilevered length of the rails 206, 208 is between 18-60 inches. In aspect, the cantilevered length is between 25-125% of the length of the cargo bed section 108.

Figure 18:
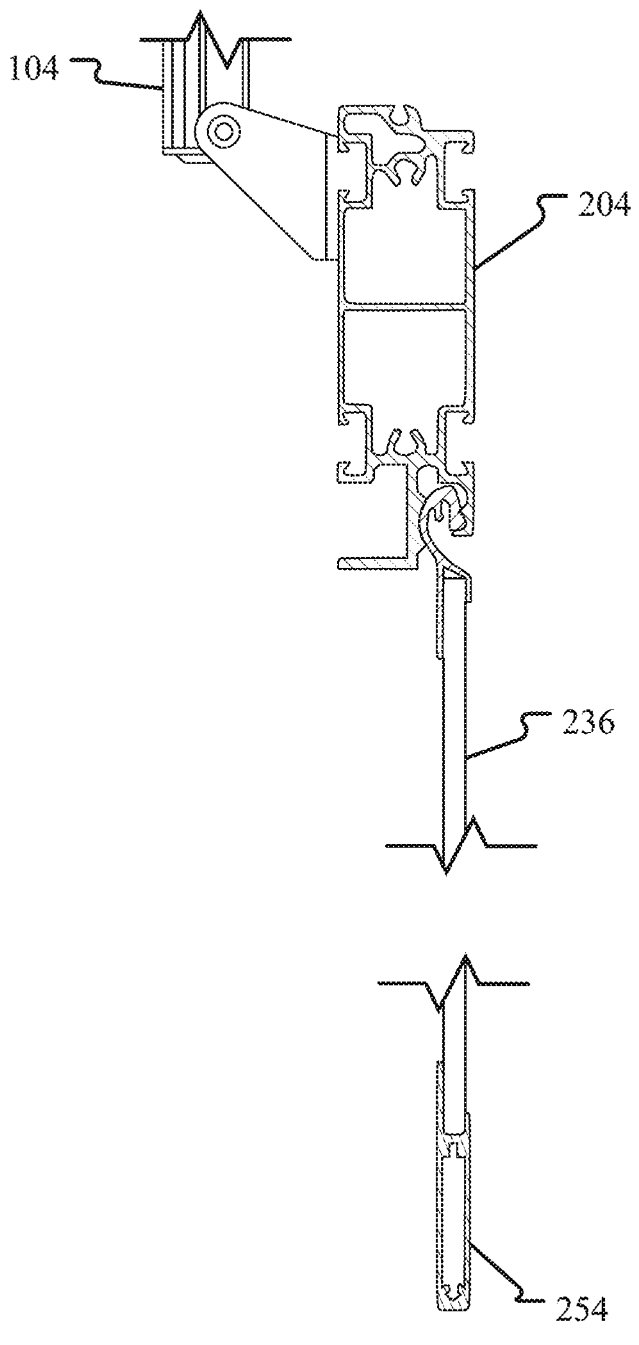
FIG. 18 is a cross-section view of the intermediate and cargo bed sections shown in FIGS. 13 and 14 and taken along line 18-18.

FIG. 18 is similar to FIG. 16 and has the rear rail 204 with the rear hatch 236 pivotably attached thereto. The rear hatch 236 is similar to the side hatch 238 but the sill rail 254 is configured to be positioned above the tailgate of the truck vehicle. As such, the rear hatch 236 may be further supported by a brace 276 at its upper portion and shown in FIG. 1. The brace 276 extends between the intermediate rail and the vertical side cargo rail for support of the rear hatch. In the example, the length of the rear hatch 236 may be longer than the side hatch 238 and extend to the bottom of the brackets. The rear hatch 236 may include a wall panel that is customizable as required or desired. The sill rail 254 may also include one or more latches configured to engage with the brackets for locking the closed position of the rear hatch door.

Figure 19:
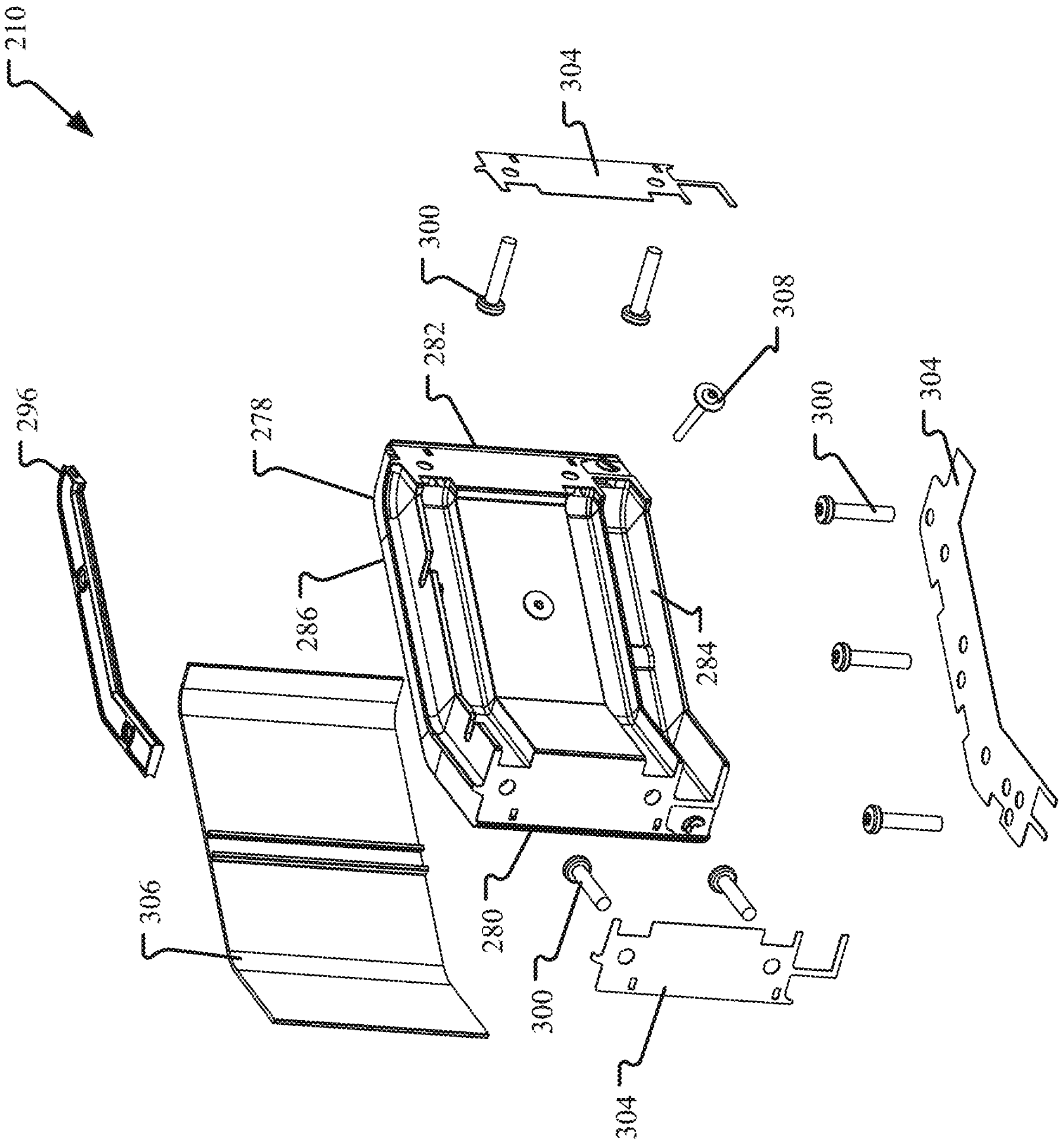
FIG. 19 is an exploded view of an intermediate bracket assembly.
Figure 20:
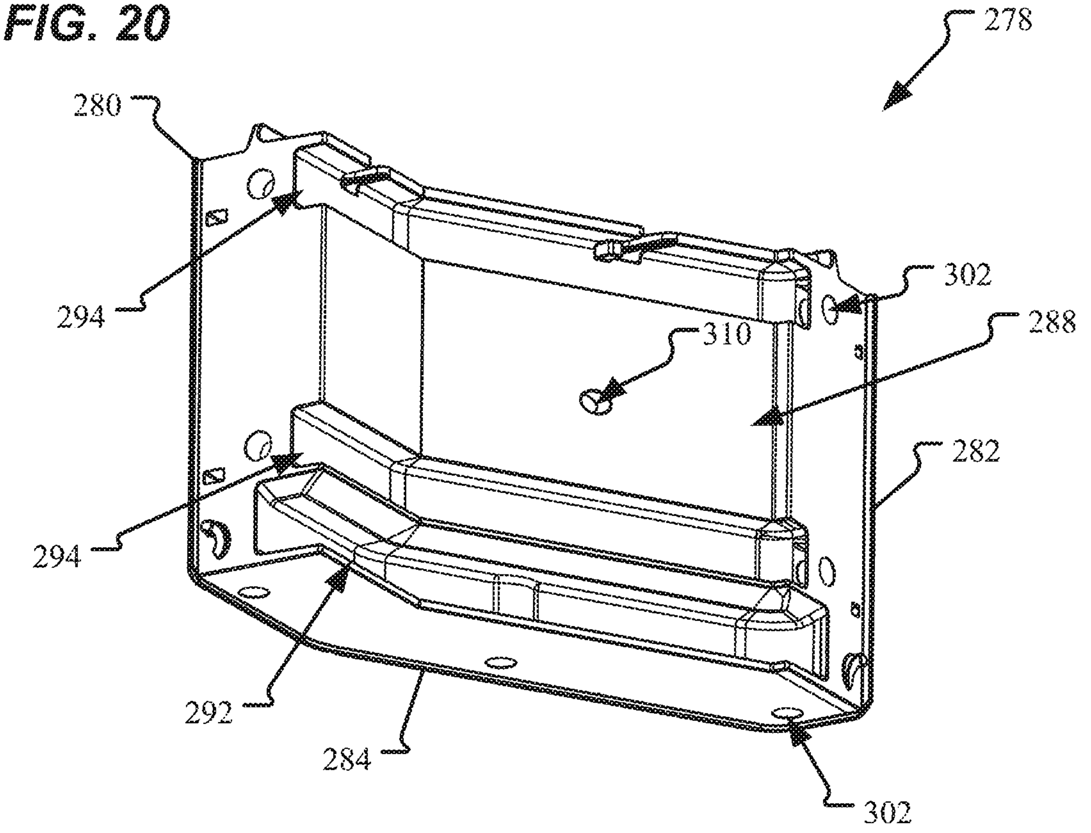
FIGS. 20 and 21 are perspective views of an intermediate bracket of the intermediate bracket assembly shown in FIG. 19.
Figure 21:
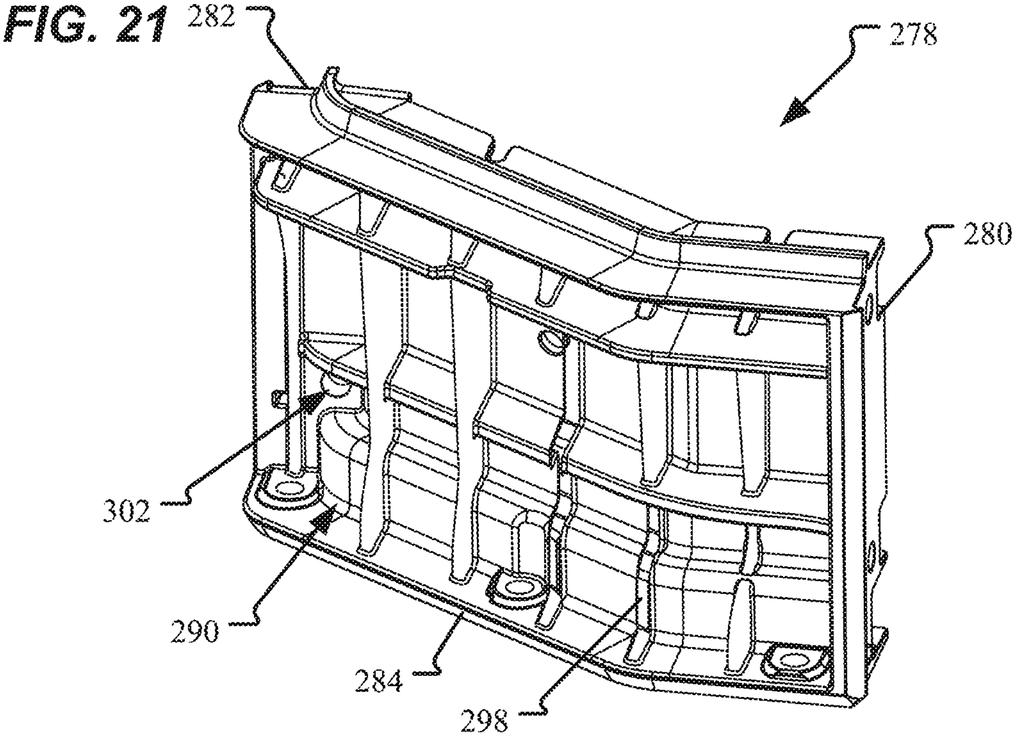

FIGS. 19-21 illustrate the intermediate bracket assembly 210. The intermediate bracket assembly 210 includes a bracket 278 that is a molded plastic component. By forming the bracket as a molded plastic component, high strength plastic can be utilized thereby increasing the strength of the frame system and features can be defined therein so that the bracket can match portions of the rails. The bracket 278 includes a first end 280 that couples to an end of an intermediate section rail, an opposite second end 282 that couples to an end of another intermediate section rail, and a bottom end 284 that selectively couples to an end of yet another rail and the cargo bed section rail. The ends 280, 282, 284 are orthogonal to each other so that the rails are positioned square to each other. Between the first end 280 and the second end 282, the bracket includes an oblique section 286 so that the bracket is not a square L-shape. In the example, the oblique section 286 matches the oblique section of the cargo bed section rail.

The bracket 278 has an interior 288 and an exterior 290. The interior 288 defines a lower channel 292 that can receive the edge of the bed panel 216. As such, the intermediate frame extends above the bed panel and capture the mattress therein and allow for the roof frame to collapse directly on top of the intermediate frame. Additionally, a pair of channels 294 correspond to the T-shaped channels of the corresponding rails. A top end includes a cover 296 so as to capture the ends of the flexible side walls and form an extension of the circular shaped channel defined in the rails. In the example, the cover 296 may secure to the bracket 278 by one or more fasteners (not shown). The exterior 290 is open with a plurality of support ridges 298. The open construction of the exterior 290 enables for fastener apertures 302 to be formed in all three of the end walls. The fasteners 300 are configured to be inserted from the exterior 290 and into the rails for coupling the bracket 278 to the rails.

In the example, a gasket 304 may be positioned between the bracket 278 and the rail. Because the exterior 290 is open, a cover 306 is used to cover the exterior cavities of the bracket 278. The cover 306 supports a nut (not shown) on its interior so that a fastener 308 can extend through a hole 310 within the oblique section 286 of the bracket 278. The configuration of the intermediate bracket assembly 210 facilitates assembly and support efficiencies.

Figure 22:
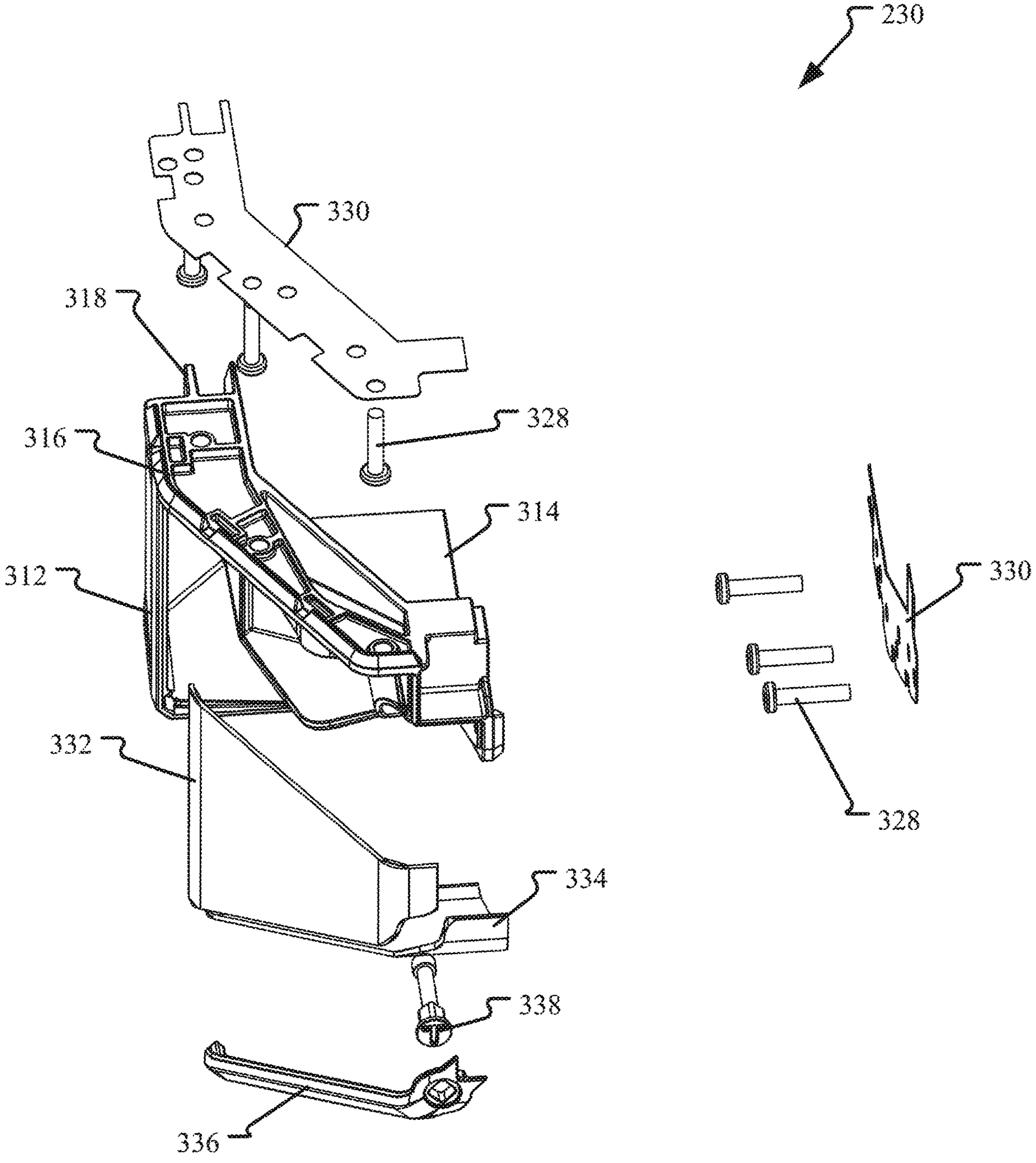
FIG. 22 is an exploded view of a cargo bed bracket assembly.
Figure 23:
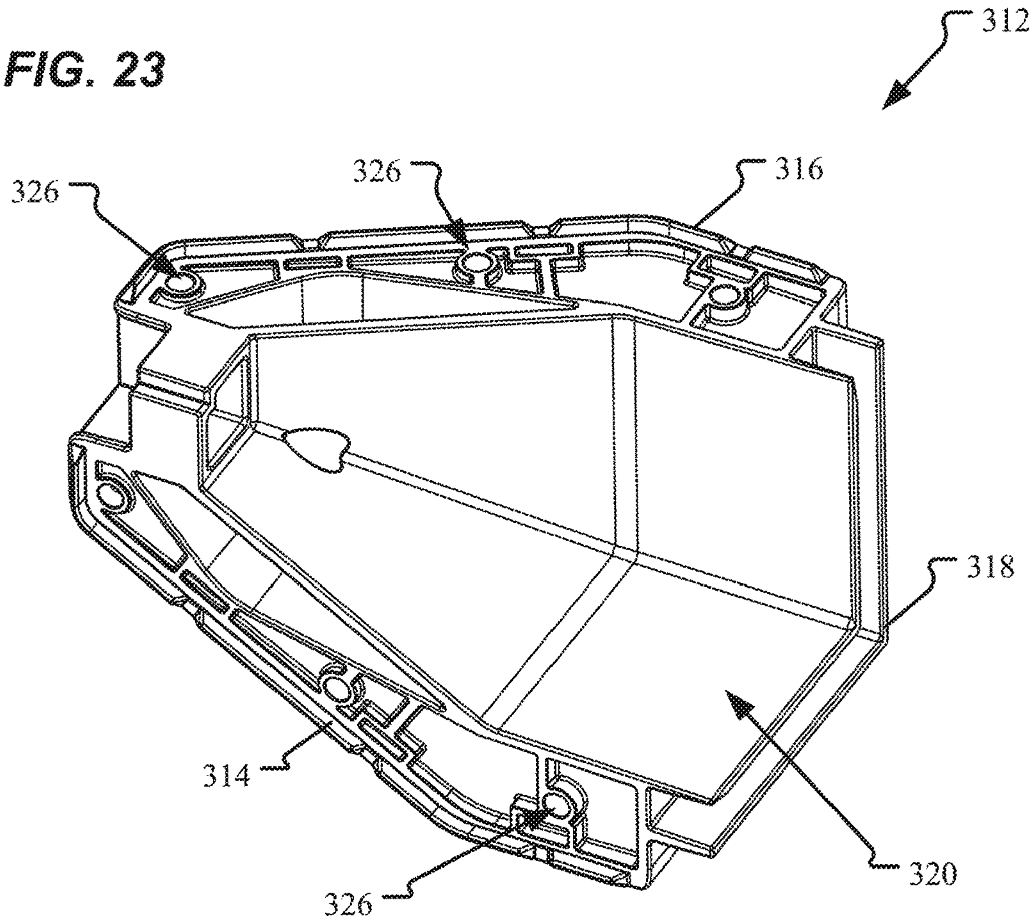
FIGS. 23 and 24 are perspective views of a cargo bed bracket of the cargo bed bracket assembly shown in FIG. 22.
Figure 24:
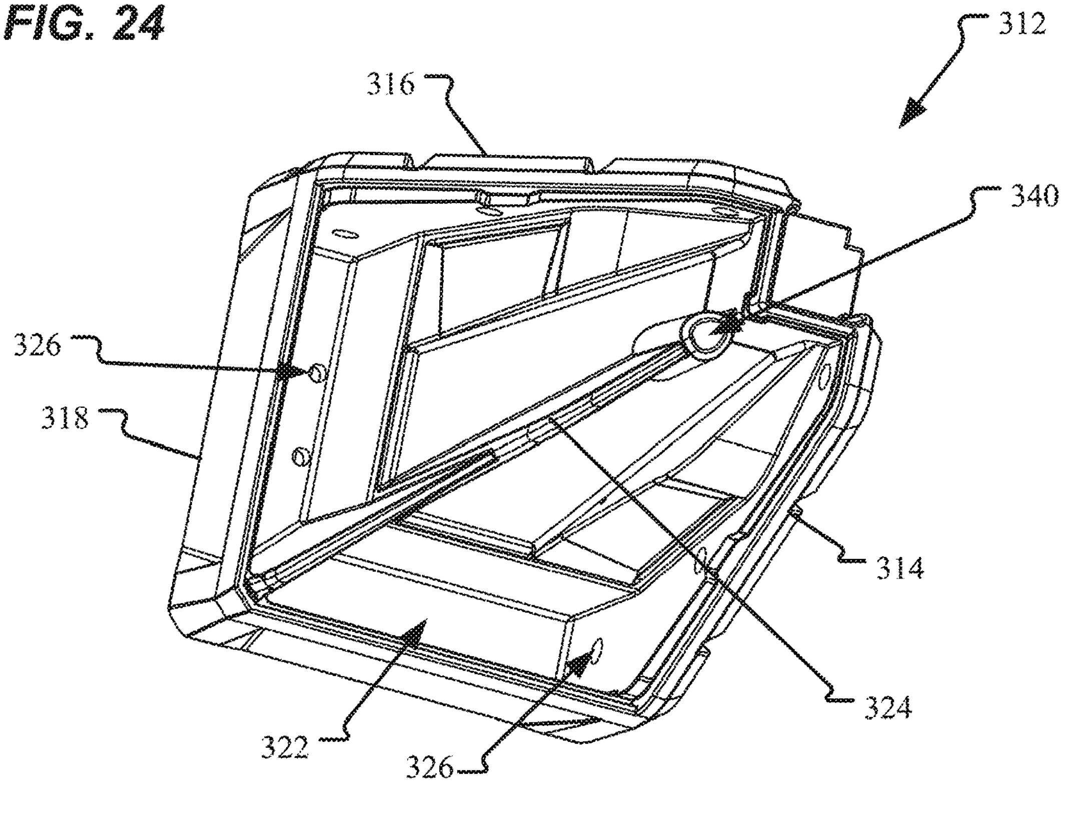

FIGS. 22-24 illustrate the cargo bed bracket assembly 230. The cargo bed bracket assembly 230 includes a bracket 312 that is a molded plastic component. The bracket 312 includes a side end 314 that couples to an end of a cargo bed section rail and a top end 316 that selectively couples to an end of another cargo bed section rail, the rails having an identical cross-sectional profile. The ends 314, 316 are orthogonal to each other so that the rails are positioned square to each other. A third end 318 is also orthogonal and is configured to support either the rear hatch or the cab wall. The third end 318 may also couple to the lower rail of the cab wall. To form the cargo bed section 108 shown in FIG. 14, the brackets from opposite corners may be formed as a mirror image to each other and so as to accommodate all four corners of the cargo bed section 108.

The bracket 312 has an interior 320 and an exterior 322. The interior 320 defines a corner for the cargo bed section frame. The exterior 322 is open with a plurality of support ridges 324. The open construction of the exterior 322 enables for fastener apertures 326 to be formed in all three of the end walls. The fasteners 328 are configured to be inserted from the exterior 322 and into the rails for coupling the bracket 312 to the rails. The third end 318 also matches the end profile of the rails and includes a U-shaped channel and an exterior notch. The notch on the vertical side of the bracket may receive the side hatch and the U-shaped channel may be configured to support the hatch latch. The same profile of the third end 318 also facilitates supporting the lower rail of the cab wall via some of the fastener apertures 326.

In the example, a gasket 330 may be positioned between the bracket 312 and the rail. Because the exterior 322 is open, a cover 332, 334 is used to cover the exterior cavities of the bracket 312. The cover is of two-piece construction and includes a support bar 336 so that a single fastener 338 is used to secure into a hole 340 of the bracket 312 and secure two orthogonal cover pieces. The configuration of the cargo bed bracket assembly 230 facilitates assembly and support. For example, the configuration of the bracket 312 enables for the side cargo rails to extend from the truck bed with coupled thereto and extend the interior living space within the truck bed camper.

Figure 25:
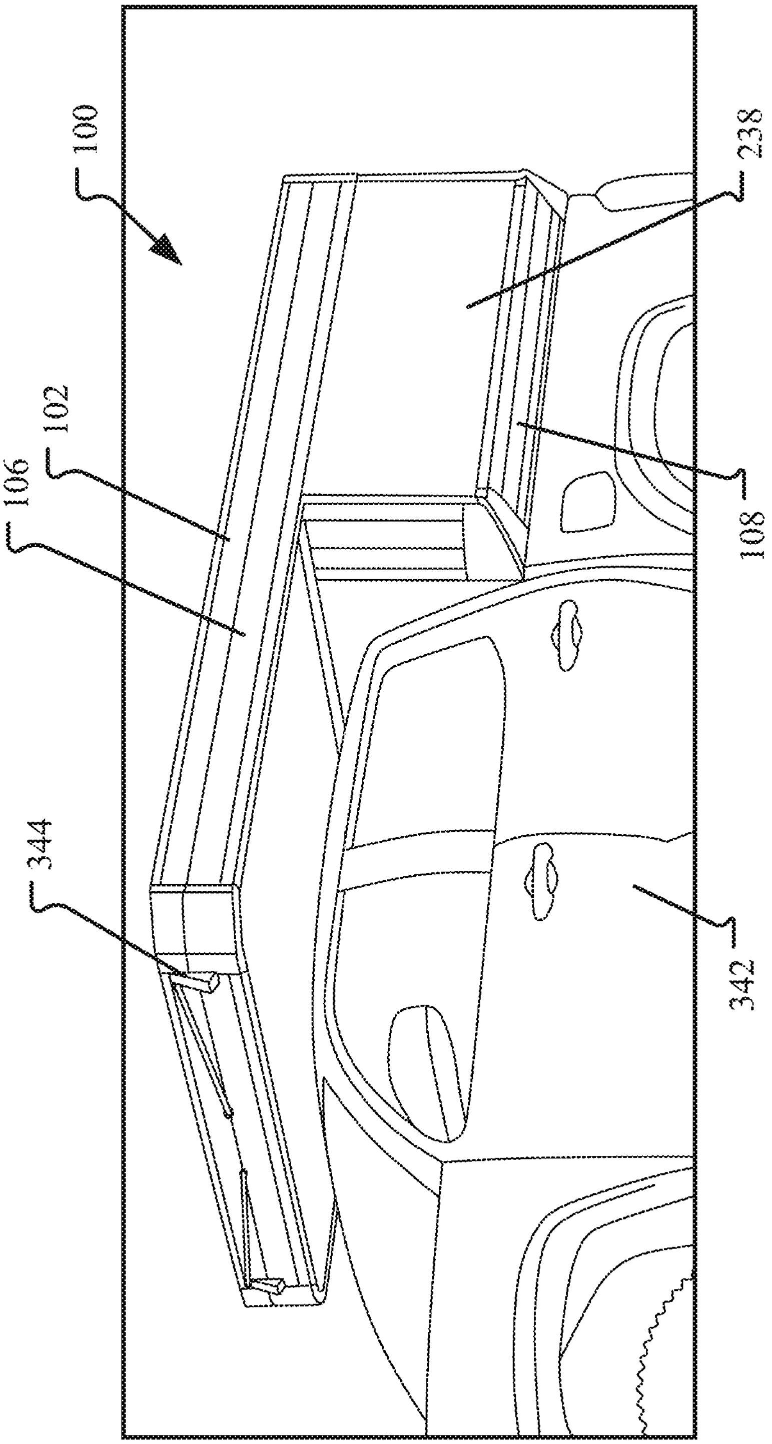
FIG. 25 is a perspective view of the truck bed camper mounted on a truck vehicle and in a collapsed configuration.

FIG. 25 is a perspective view of the truck bed camper 100 mounted on a truck vehicle 342 and in a collapsed configuration. In the collapsed configuration, the roof 102 is positioned directly on top of the intermediate section 106 and both the roof 102 and the intermediate section 106 are substantially parallel with each other. This collapsed configuration pulls the flexible side walls into the interior of the frame system. The T-shaped channels of the roof frame and the intermediate frame can support a latch assembly 344 so as to secure the truck bed camper in the collapsed configuration. The frames of the cargo bed section 108 enable the side hatches 238 to be positioned outside of the truck bed and increase the inside living area space.

Figure 26:
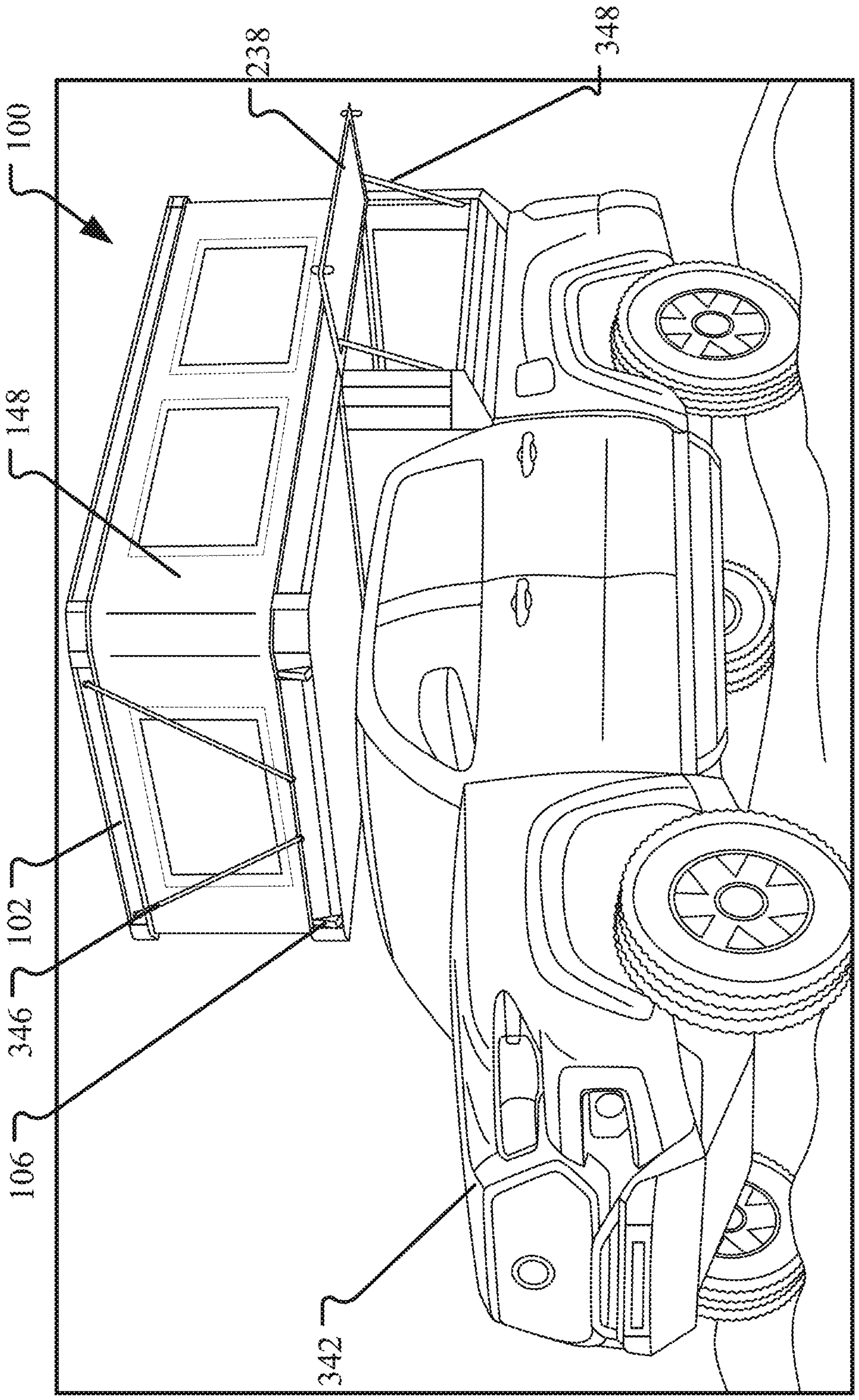
FIG. 26 is a perspective view of the truck bed camper mounted on the truck vehicle and in a raised configuration.

FIG. 26 is a perspective view of the truck bed camper 100 mounted on the truck vehicle 342 and in a raised configuration. In the raised configuration, the roof 102 is raised vertically and still substantially parallel to the intermediate section 106. The flexible side walls 148 extend between the roof 102 and the intermediate section 106. The flexible side walls 148 can include any number of discrete panels coupled together. One or more of the panels can include a window system. One or more struts 346 may extend between the roof frame and the intermediate frame for lateral support and/or to facilitate movement between the collapsed and raised configurations. The side hatch 238 is also shown in an open position, the side hatch 238 can include one or more struts 348 configured to hold the side hatch 238 in the open position.

As described herein, the pop-up truck bed camper is formed with a frame system having a roof frame, an intermediate frame, and a cargo bed frame. Each of the frame portions are formed with extruded rails coupled together with a molded plastic bracket. This modular system facilitates transportation, assembly, and repair of the truck bed camper. Additionally, the frame system is durable and strong. The extruded rails define a plurality of channels to support an exterior wall system of the truck bed camper. The exterior wall system includes flexible side panels, ridged roof, bed, and side panels, as well as pivotable hatch panels. Additionally, the channels also facilitate additional accessory attachments to the frame system as required or desired.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A truck bed camper comprising:

a first cargo side frame including a plurality of first side rails coupled together with a plurality of first cargo brackets, the first cargo side frame configured to secure to a truck bed of a truck;

a second cargo side frame including a second plurality of side rails coupled together with a second plurality of cargo brackets, the second cargo side frame spaced apart from the first cargo side frame and configured to secure to the truck bed of the truck;

an intermediate frame including a plurality of intermediate rails coupled together with a plurality of intermediate brackets, the intermediate frame supported on the first and second cargo side frames and having at least one bed panel, wherein the intermediate frame cantilevers from the first and second cargo side frames;

a roof frame including a plurality of roof rails coupled together with a plurality of roof brackets, the roof frame having at least one roof panel and moveably disposed above the intermediate frame, the roof frame moveable between at least a collapsed configuration, whereby the roof frame is positioned directly on top of the intermediate frame, and a raised configuration, whereby the roof frame is spaced apart from the intermediate frame, wherein each of the plurality of first and second side rails, the plurality of intermediate rails, and the plurality of roof rails are extruded components, and each include an internal receiver configured to receive a fastener for securing to a respective bracket; and at least one hinged roof support coupled between the intermediate frame and the roof frame and configured to move the roof frame between the collapsed configuration and the raised configuration, and wherein the roof frame is substantially parallel to the intermediate frame in both the collapsed configuration and the raised configuration.

2. The truck bed camper of claim 1, wherein the plurality of first and second cargo brackets, the plurality of intermediate brackets, and the plurality of roof brackets are formed from a different material than the plurality of first and second side rails, the plurality of intermediate rails, and the plurality of roof rails.

3. The truck bed camper of claim 1, wherein each of the plurality of first and second cargo brackets, the plurality of intermediate brackets, and the plurality of roof brackets have an interior side and an exterior side, a plurality of apertures are defined and accessible from the exterior side for the fastener.

4. The truck bed camper of claim 1, further comprising at least one flexible side wall extending between the intermediate frame and the roof frame, wherein the intermediate frame defines a first exterior channel extending through the plurality of intermediate rails and the plurality of intermediate brackets, and wherein the roof frame defines a second exterior channel extending through the plurality of roof rails and the plurality of roof brackets, the at least one flexible side wall coupled between the first and second exterior channels.

5. The truck bed camper of claim 1, wherein the at least one hinged roof support includes a first member pivotably coupled to one of the plurality of intermediate rails and a second member pivotably coupled to one of the plurality of roof rails, the first member pivotably coupled to the second member at a hinge, the at least one hinged roof support further includes an elongated third member having a first end pivotably coupled to the one of the plurality of intermediate rails and a second end configured to engage with the second member to lock the roof frame in the raised configuration.

6. The truck bed camper of claim 5, wherein each of the plurality of intermediate rails and the plurality of roof rails include at least one substantially T-shaped channel, the at least one hinged roof support coupled to a respective rail at the at least one substantially T-shaped channel.

7. The truck bed camper of claim 1, further comprising a light system, and wherein each of the plurality of roof rails include an exterior light channel configured to support the light system.

8. The truck bed camper of claim 1, further comprising at least one hatch door having a top rail, a sill rail, and a wall panel therebetween, wherein each of the plurality of intermediate rails include an exterior hatch channel, the top rail at least partially received within the exterior hatch channel such that the at least one hatch door pivots relative to a respective intermediate rail.

9. The truck bed camper of claim 1, wherein the first and second cargo side frames each include a pair of vertical side rails and a bottom horizontal side rail of the plurality of first and second side rails, the pair of vertical side rails and the bottom horizontal side rail each having the same cross-sectional profile.

10. The truck bed camper of claim 1, further comprising a cab wall extending between the first and second cargo side frames, the cab wall supporting the at least one bed panel.

11. A truck bed camper comprising:

a first cargo side frame having a first bottom rail, a first front vertical rail, and a first rear vertical rail forming a U-shape, each of the rails of the first cargo side frame coupled together by a pair of first brackets;

a second cargo side frame spaced apart from the first cargo side frame, the second cargo side frame having a second bottom rail, a second front vertical rail, and a second rear vertical rail forming a U-shape, each of the rails of the second cargo side frame coupled together by a pair of second brackets, the rails of the first and second cargo side frames all having a first cross-sectional profile;

an intermediate frame having a first front rail, a first rear rail, a first side rail, and a second side rail forming a rectangular shape, each of the rails of the intermediate frame coupled together by a plurality of third brackets, the first and second side rails supported on the respective first and second cargo side frames such that the first and second side rails are cantilevered and the first front rail is offset from the first and second cargo side frames, the rails of the intermediate frame all having a second cross-sectional profile that is different than the first cross-sectional profile;

a roof frame having a second front rail, a second rear rail, a third side rail, and a fourth side rail forming a rectangular shape, each of the rails of the roof frame coupled together by a plurality of fourth brackets, the rails of the roof frame all having a third cross-sectional profile that is different than the first and second cross-sectional profiles; and at least one hinged roof support coupled between the intermediate frame and the roof frame, the roof frame being selectively vertically moveable relative to the intermediate frame via the at least one hinged roof support.

12. The truck bed camper of claim 11, wherein the first cargo side frame supports a first side hatch and the second cargo side frame supports a second side hatch, the first and second side hatches positioned outward from an inner edge of the first and second bottom rails.

13. The truck bed camper of claim 11, further comprising a flexible side wall extending between the intermediate frame and the roof frame.

14. The truck bed camper of claim 11, wherein the pair of first brackets and the pair of second brackets have a shape that is the same, the shape of the first and second brackets being different than a shape of the plurality of third brackets that are also different than a shape of the plurality of fourth brackets.

15. The truck bed camper of claim 11, wherein each of the brackets are formed from a different material than each of the rails.

16. The truck bed camper of claim 11, further comprising one or more roof panels supported by the roof frame, wherein each of the plurality of roof rails and the plurality of fourth brackets define a channel shaped and sized to receive an edge of the one or more roof panels, and wherein one or more wedges secure the edge of the one or more roof panels within the channel.

17. A pop-up frame for a truck bed camper comprising:

a plurality of roof rails defining a roof frame, each of the plurality of roof rails coupled together with a plurality of roof brackets formed from a different material than the plurality of roof rails;

a plurality of intermediate rails defining an intermediate frame disposed below the roof frame, each of the plurality of intermediate rails coupled together with a plurality of intermediate brackets formed from a different material than the plurality of intermediate rails, wherein the intermediate frame defines a first exterior channel extending through the plurality of intermediate rails and the plurality of intermediate brackets;

a plurality of side rails defining a pair of cargo side frames disposed below the intermediate frame, each of the plurality of side rails coupled together with a plurality of cargo brackets formed from a different material than the plurality of side rails, wherein the roof frame defines a second exterior channel extending through the plurality of roof rails and the plurality of roof brackets;

at least one flexible side wall configured to extend between the first and second exterior channels; and a plurality of hinged roof supports extending between the intermediate frame and the roof frame, the plurality of hinged roof supports configured to move the roof frame between at least a raised configuration and a collapsed configuration with respect to the intermediate frame, and the roof frame being substantially parallel to the intermediate frame in both the raised configuration and the collapsed configuration.

18. The pop-up frame of claim 17, wherein each of the plurality of hinged roof supports includes a first member pivotably coupled to one of the plurality of intermediate rails and a second member pivotably coupled to one of the plurality of roof rails, the first member pivotably coupled to the second member at a hinge, an elongated third member having a first end pivotably coupled to the one of the plurality of intermediate rails and a second end configured to engage with the second member to lock the roof frame in the raised configuration.

19. A truck bed camper comprising:

a first cargo side frame including a plurality of first side rails coupled together with a plurality of first cargo brackets, the first cargo side frame configured to secure to a truck bed of a truck;

a second cargo side frame including a second plurality of side rails coupled together with a second plurality of cargo brackets, the second cargo side frame spaced apart from the first cargo side frame and configured to secure to the truck bed of the truck;

an intermediate frame including a plurality of intermediate rails coupled together with a plurality of intermediate brackets, the intermediate frame supported on the first and second cargo side frames and having at least one bed panel, wherein the intermediate frame cantilevers from the first and second cargo side frames;

a roof frame including a plurality of roof rails coupled together with a plurality of roof brackets, the roof frame having at least one roof panel and moveably disposed above the intermediate frame, the roof frame moveable between at least a collapsed configuration, whereby the roof frame is positioned directly on top of the intermediate frame, and a raised configuration, whereby the roof frame is spaced apart from the intermediate frame; and at least one hinged roof support coupled between the intermediate frame and the roof frame and configured to move the roof frame between the collapsed configuration and the raised configuration, and wherein the roof frame is substantially parallel to the intermediate frame in both the collapsed configuration and the raised configuration, wherein the at least one hinged roof support includes a first member pivotably coupled to one of the plurality of intermediate rails and a second member pivotably coupled to one of the plurality of roof rails, the first member pivotably coupled to the second member at a hinge, the at least one hinged roof support further includes an elongated third member having a first end pivotably coupled to the one of the plurality of intermediate rails and a second end configured to engage with the second member to lock the roof frame in the raised configuration.

* * * * *